US008038202B2

(12) United States Patent
Ueda et al.

(10) Patent No.: US 8,038,202 B2
(45) Date of Patent: Oct. 18, 2011

(54) OPERATORS SECTION CONSTRUCTION FOR WORK VEHICLE

(75) Inventors: Masaaki Ueda, Sakai (JP); Takehiro Sakai, Sakai (JP)

(73) Assignee: Kubota Corporation, Osaka (JP)

( * ) Notice: Subject to any disclaimer, the term of this patent is extended or adjusted under 35 U.S.C. 154(b) by 302 days.

(21) Appl. No.: 12/411,096

(22) Filed: Mar. 25, 2009

(65) Prior Publication Data

US 2009/0243338 A1 Oct. 1, 2009

(30) Foreign Application Priority Data

Mar. 27, 2008 (JP) ................................ 2008-084036
Mar. 27, 2008 (JP) ................................ 2008-084037
Mar. 27, 2008 (JP) ................................ 2008-084038

(51) Int. Cl.
*B60N 99/00* (2006.01)

(52) U.S. Cl. ............................ 296/190.08; 296/190.01

(58) Field of Classification Search ............ 296/190.01, 296/190.08

See application file for complete search history.

(56) References Cited

U.S. PATENT DOCUMENTS

| | | | | |
|---|---|---|---|---|
| 6,039,141 A * | 3/2000 | Denny | ..................... | 296/190.01 |
| 6,086,142 A * | 7/2000 | Simmons et al. | ........ | 296/190.01 |
| 6,612,636 B2 * | 9/2003 | Arthur et al. | ............. | 296/190.01 |
| 6,942,282 B1 * | 9/2005 | Jacobs et al. | ............. | 296/190.08 |
| 7,243,982 B2 * | 7/2007 | Kelley et al. | ............. | 296/190.08 |
| 2005/0210718 A1 | 9/2005 | Ueda et al. | | |
| 2006/0170251 A1 * | 8/2006 | Ishii et al. | ................ | 296/190.09 |
| 2009/0195025 A1 * | 8/2009 | Shurts et al. | ............. | 296/190.08 |
| 2010/0109380 A1 * | 5/2010 | Jorgensen | ................ | 296/190.01 |
| 2010/0187859 A1 * | 7/2010 | Hill et al. | ................. | 296/190.01 |

FOREIGN PATENT DOCUMENTS

| | | |
|---|---|---|
| JP | 09-195315 A | 7/1997 |
| JP | 2002149255 | 5/2002 |
| JP | 2004-116048 S | 4/2004 |
| JP | 2007-217892 A1 | 8/2007 |

* cited by examiner

*Primary Examiner* — Lori Lyjak

(74) *Attorney, Agent, or Firm* — The Webb Law Firm

(57) ABSTRACT

An operator's section construction for a work vehicle includes an operating device mounted on a vehicle body, a driver's seat mounted on the operating deck, a first operating device provided on one of right and left sides of the operating deck and a second operating device provided on the other of the right and left sides of the operating deck. On an upper face of the operating deck, there are formed a mounting portion for the driver's seat, a mounting portion for the first operating device, and a mounting portion for the second operating device; the driver's seat, the first operating device and the second operating devices being mounted on the respective mounting portions independently of each other.

6 Claims, 20 Drawing Sheets

OPERATORS SECTION CONSTRUCTION FOR WORK VEHICLE

TECHNICAL FIELD

The present invention relates to an operator's section construction for a work vehicle such as a backhoe, a skid loader, a track loader, for use in construction works, civil engineering works, etc.

BACKGROUND ART

With this type of conventional technique, a traveling machine includes an excavator device attached to a front portion of a swiveling deck mounted to be swivellable about a vertical axis, an operating deck fixed on the swiveling deck, a driver's seat mounted on the operating deck, an engine mounted to a rear portion of the swiveling deck, an operational oil tank mounted to a right side portion of the swiveling deck, and right and left controlling devices disposed on the right and left sides of the driver's seat. The right and left controlling devices include a main control valve operated by a control lever to allow such operations as a swiveling operation of the swivel deck, operations of a boom, an arm and a bucket of the excavator device, etc. (See JP2002-149255A).

SUMMARY OF THE INVENTION

Problem To Be Solved by Invention

The operating deck of the conventional technique includes an upper face section and right and left leg sections, with the drivers seat being mounted on the upper face section, the left operating device being attached to the left side face and the right operating device being attached to the right side face, respectively. Hence, it is necessary to fix by e.g. bolts, the right and left operating devices to the operating deck from the right and left sides thereof. Further, the maintenance of the right and left operating devices is difficult and the space below them is a dead space being unutilized. Moreover, although space is available inside the operating deck, but, it is difficult to accommodate a large vehicle instrument therein.

The object of the invention is to provide an operator's section construction for a work vehicle which can overcome the above drawbacks of the prior art.

Means to Solve Problems

According to a characterizing feature of the present invention, an operator's section construction for a work vehicle, comprising:

an operating deck mounted on a vehicle body;

a driver's seat mounted on the operating deck;

a first operating device provided on one of right and left sides of the operating deck; and a second operating device provided on the other of the right and left sides of the operating deck;

wherein on an upper face of the operating deck, there are formed a mounting portion for the driver's seat, a mounting portion for the first operating device, and a mounting portion for the second operating device; the driver's seat, the first operating device and the second operating devices being mounted on the respective mounting portions independently of each other.

Preferably, in the above-described construction, said operating deck includes a substantially flat upper face portion, a left leg portion and a right leg portion; said left leg portion is provided in substantial correspondence with a left side face of one of said first and second operating devices; said right leg portion is provided in substantial correspondence with a right side face of the other of said first and second operating devices; an accommodating space opened on the front side thereof is formed downwardly of said upper face portion and between said right and left leg portions; and said accommodating space accommodates therein a vehicle instrument.

Preferably, in the above-described construction, said first operating device includes an operating box which includes an operating valve; a support bracket attached erect on the upper face of said operating deck supports said operating box via a pivot mechanism such that said first operating device is supported to be pivotable about a horizontal axis from a use posture; said first operating device is disposed on the upper face of said operating deck; and said pivot mechanism is disposed upwardly of the upper face of said operating deck.

Preferably, in the above-described construction, said support bracket includes an attaching portion to be fixed to the upper face of said operating deck, and a supporting portion provided erect from said attaching portion for supporting said operating box; said attaching portion is positioned substantially within a right/left width of said operating box; and a face of said operating box opposite from said driver' seat is adjacent in the right/left direction, to an end of said operating deck.

Preferably, in the above-described construction, said operating box includes, at a front upper portion thereof, an attaching portion for an operating valve, said attaching portion being attached at three points of the front portion and the rear portion of the operating valve opposite away from the driver's seat, and the rear portion on the side of the drivers seat and further includes an attaching hole provided on the side of the driver's seat and on the front side.

Preferably, in the above-described construction, said second operating device includes a first valve and a second valve in an operating bracket; said operating bracket includes a plurality of projecting portions projecting to the lateral said from a vertical wall provided erect on said operating deck; and said plurality of projecting portions function as an attaching portion for attaching said first valve and said second valve from the right and left sides.

Preferably, in the above-described construction, said projecting portions are formed as projections integral with said vertical wall to the side of said driver's seat; the attaching portion of said first valve includes an attaching opening at a front portion thereof on the side of the driver's seat; and the attaching portion of said second valve includes an attaching opening at a side portion on the side of the driver's seat.

According to the above-described construction, since the driver's seat, the first operating device and the second operating device are mounted independently of each other on the respective mounting portions provided in the upper face of the operating deck, these components can be assembled from above the operating deck and the operating deck can have a large right/left width and the space under the first and second operating devices can be effectively utilized as a large accommodating space for accommodating a large vehicle instrument.

The operating deck can be formed simple of two members, and respective interiors thereof can be utilized as an accommodating space for an air conditioner and an accommodating space for an electric switch box.

Therefore, it is possible to mount the driver's seat, the left operating device and the right operating device constructed independently of each other, on the upper face of the operating deck. A large vehicle instrument can be accommodated within the interior of the operating deck. The maintenance of the right and left operating devices can be easily carried out. And, the spaces downwardly thereof can be effectively utilized.

Further, according to the above-described construction, if the support bracket is mounted erect on the upper face of the operating deck and the operating devices are disposed on the upper face of the operating deck and the pivot mechanism is disposed upwardly of the upper face of the operating deck, attachment of the operating devices can be done from above the operating deck so that maintenance operations of the operating valves, the pivot mechanism, etc. can be easily carried out.

If said attaching portion is positioned substantially within a right/left width of said operating box; and a face of said operating box opposite from said driver' seat is adjacent, in the right/left direction, to an end of said operating deck.

Further, if the support bracket includes an attaching portion which is located substantially within the right/left width of the operating box and the face of the operating box opposite from the side of the driver's seat is adjacent, in the right/left direction, to the lateral end of the operating deck, the right/let width of the operating devices can be minimized and no dead space is formed downwardly thereof and can be arranged in a compact manner.

If an attaching portion for the operating valve is provided at a front upper portion of the operating box and this attaching portion forms an attaching opening, then, through this attaching opening, the operating valve can be attached to the attaching portion from the front side of the driver's seat. Thus, attachment and detachment of the operating valve and the maintenance thereof can be carried out extremely easily.

As a result, the attaching and detachment and maintenance of the operating devices, the operating valve, the pivot mechanism, etc. can be carried out easily and also the area occupied by the operator's section can be compact.

Further, as the operating bracket attaches the first valve and the second valve with the plurality of projections projecting from the vertical wall provided erect on the operating deck to the lateral side, the first valve and the second valve are supported in the cantilever manner, so that the valves can be attached/detached from the lateral side. Hence, the attachment/detachment and maintenance of the first and second valves can be carried out easily, and the area occupied by the operator's section can be compact.

When the operating bracket is formed with integral formation of the vertical wall and the plurality of projections, the manufacture thereof can be easy. And, as the attaching openings are formed respectively in the attaching portion of the first valve and the attaching portion of the second valve, the first valve and the second valve can be easily inserted or withdrawn not from the vertical direction, but from the lateral direction, so the maintenance becomes easy.

As the operating devices are attached from above to the upper face of the operating deck, attachment and detachment of the operating devices can be carried out easily and no dead space is formed downwardly of the operating devices and the space occupied by the operator's section can be formed compact.

Therefore, the attachment and detachment of the first valve and the second valve relative to the operating bracket and the maintenance thereof can be carried out easily.

EMBODIMENTS OF THE INVENTION

Next, embodiments of the present invention will be described with reference to accompanying drawings.

Figure 19:
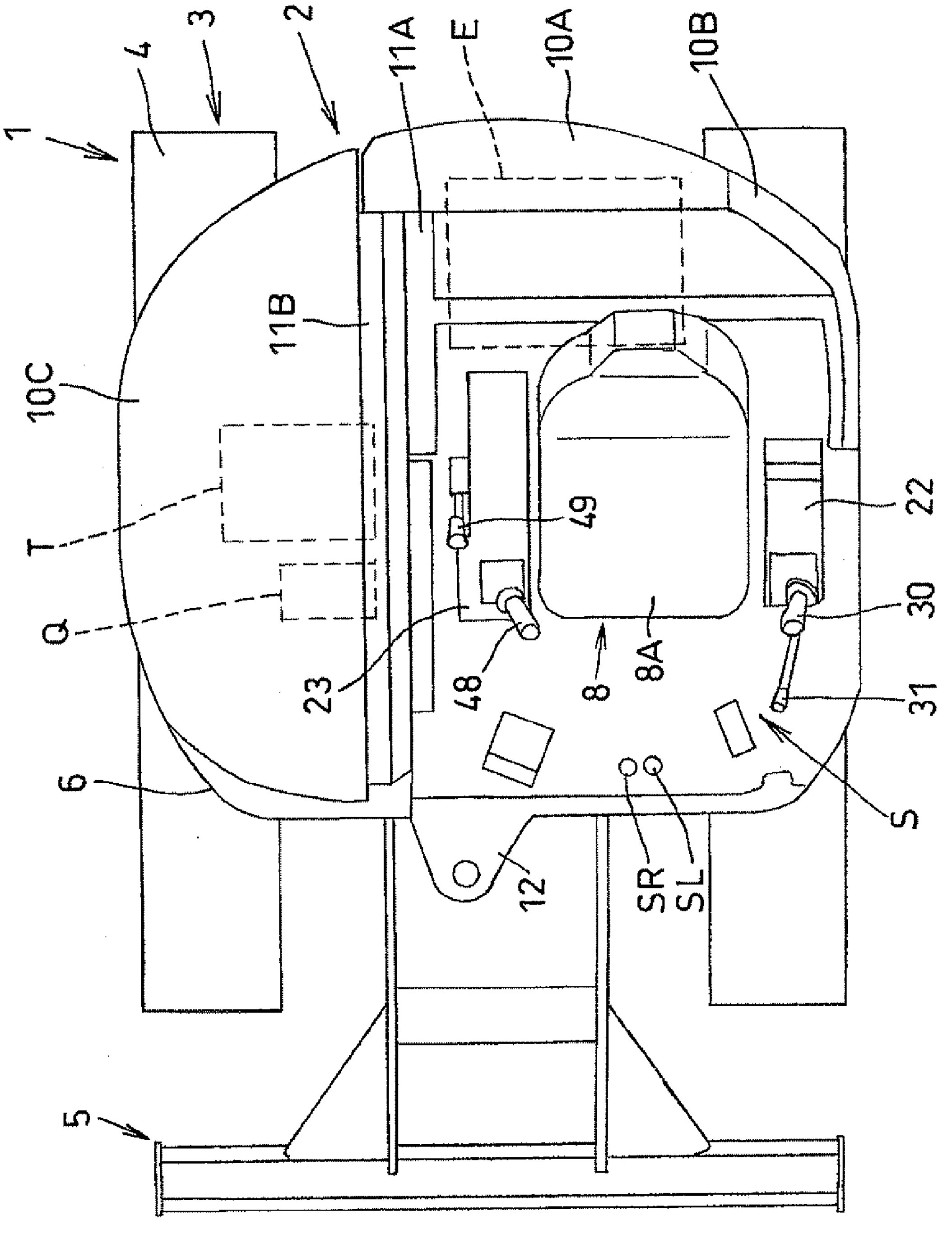
Figure 20:
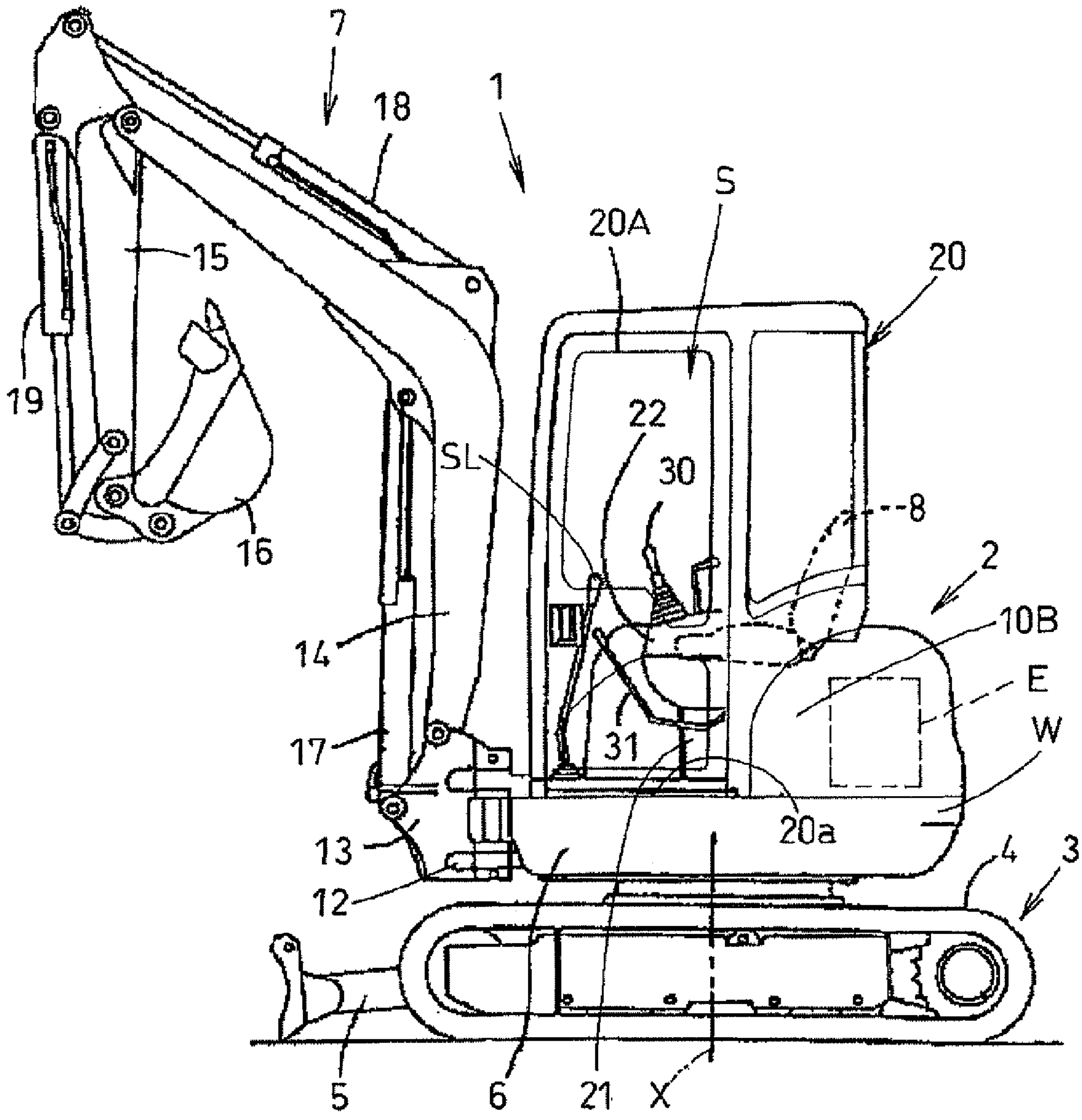

In FIG. 19 and FIG. 20, numeral 1 denotes a backhoe as an example of a work vehicle (swiveling work vehicle). This backhoe 1 includes an upper swiveling body (upper structure member) 2, a traveling device 3 provided downwardly of the swiveling body 2, a dozer device 5 as an implement attached to the front portion of the traveling device 3, and an excavator device 7 as an implement attached to the front portion of the swiveling body 2.

The traveling device 3 is constructed as a crawler type traveling device wherein crawler traveling units 4 are mounted on the right and left sides and drive wheels of the right and left crawler traveling units 4 are driven respectively by hydraulic motor. Each crawler traveling unit 4 includes an idler disposed on one of front and rear sides, a drive wheel disposed on the other of the front and rear sides, a plurality of track rollers disposed between the idler and the drive wheel, and a crawler bent entrained about these.

The dozer device 5 is pivotally attached to the front portion of the traveling device 3 to be vertically pivotable relative thereto by means of a dozer cylinder comprised of a hydraulic cylinder.

The swiveling body 2 includes a swivel deck (machine body) 6 which is supported on the traveling device 3 to be swivellable about a vertical axis S by means of a hydraulic swiveling motor. And, substantially at the front/rear center on this swivel deck 6, a driver's seat 8 is disposed and at a rear portion of the swivel deck 6, an engine E is mounted. At a right portion on the swivel deck 6, there are mounted an operational oil tank T and a control valve Q. Between the operational tank T and the driver's seat 8, there is provided a lateral partitioning wall 11B. On the right and left sides of the driver's seat 8, there are disposed operating devices 22, 22 respectively.

To the front portion of the swivel deck 6, the excavator device 7 is attached. And, in order to obtain good weight balance relative to this excavator device 7, etc., at the rear portion of the swivel deck 6, there is mounted a counter weight W, in addition to the engine E.

An engine room housing therein the engine E, the hydraulic pump, an air cleaner, etc. disposed at the rear portion of the swivel deck 6 is sectioned by a front/rear partitioning wall 11A having the front side thereof fixed between the engine room and the driver's seat 8. And, rear and left sides thereof are covered by a rear hood 10A and a left cover 10B, etc.

A tank room housing therein the operational oil tank T on the right side, the control valve Q, a radiator, etc. 6 is sectioned by the lateral partitioning wall 11B having the left side thereof fixed between the room and the driver's seat 8. And, upper, front and right sides thereof are covered by a right cover 10C respectively.

The excavator device 7 includes a boom 14 supported to a pivot bracket 13 to be vertically pivotable relative thereto, an arm 15 having a base end portion thereof pivotally supported to the leading end of the boom 14, and a bucket 16 attached to the leading end of the arm 15 to be cable of scooping/dumping actions. And, these components are operable by means of a boom cylinder 17, an arm cylinder 18, and a bucket cylinder 19 each of which is comprised of a hydraulic cylinder.

In the excavator device 7, a swing bracket 13 is supported to a support bracket 12 affixed to the front portion of the swivel deck 6 to be pivotable to the right or left about a vertical axis. And, this swing bracket 13 is pivoted to the right or left by means of a hydraulic swing cylinder.

In FIGS. 1-3 and 18-20, an operator's section S on the swivel deck 6 is partitioned by the front/rear partitioning wall 11A and the lateral partitioning wall 11B. The driver's seat 8 is disposed forwardly of the front/rear partitioning wall 11A and on the left side of the lateral partitioning wall 11B. Forwardly of the driver's seat 8, there are disposed a pair of left and right traveling operating levers SL, SR for operating the left and right crawler traveling units 4 individually or simultaneously. And, at the right and left foot portions, pedals are disposed.

A cabin 20 surrounding the operator's section S is mounted on the swivel deck 6. This cabin 20 has its rear lower portion formed of the front/rear partitioning wall 11A. The right side wall of the cabin 20 exists, but can be formed of the lateral partitioning wall 11B instead. At an entrance/exit 20*a* of the cabin 20, there is provided a door 20A which can be opened and closed.

Instead of the cabin 20, a two-column type ROPS or a four-column type canopy (driver's seat protecting device with sunshade) may be mounted.

In FIGS. 1-7, in the operator's section S, an operating deck 21 is provided on the swivel deck 6 and on this operating deck 21, the driver's seat 8 and the right and left operating devices 22 and 23 are mounted. The driver's seat 8, the left operating device 22 and the right operating device 23 are constructed and assembled independently of each other.

In its front view, the operating deck 21 has a rectangular shape with its lower side open and includes a substantially flat upper face portion 21A and left and right leg portions 21L, 21R, and a front-opened accommodating space 21B being formed downwardly of the upper face portion 21A and between the left and right leg portions 21L, 21R, and this accommodating space 21B accommodates therein a vehicle instrument K.

In the upper face of the operating device 21, there are formed a mounting portion 21*a* for the driver's seat 8, a mounting portion 21*b* for the left operating device 21 and a mounting portion 21*c* for the right operating device 23 and on these mounting portions 21*a*-21*c*, the driver's seat 8, the left operating device 22 and the right operating device 23 are mounted respectively and fixed thereto by means of fastening members such as bolts. In the driver's seat 8, the bottom face of a sheet 8A has a right/left width greater than a cushioning member 8B.

The left leg portion 21L corresponds substantially to the left side face of the left operating device 22 and the right leg portion 21R corresponds substantially to the right side face of the right operating device 23. The entire area from the left side face of the left operating device 22 to the right side face of the right operating device 23 is formed on the operating deck 21.

That is to say, the left operating device 22 is disposed on the left side of the driver's seat 8 and the opposite side face thereof away from the driver's seat 8 is adjacent, in the right/left direction, to the left end portion of the operating deck 21 and the right operating device 23 is disposed on the right side of the driver's seat 8 and the opposite side face thereof away from the driver's seat 8 is adjacent, in the right/left direction, to the right end portion of the operating deck 21.

The operating deck 21 is formed of a metal plate and includes a first member P1 having the driver's seat mounting portion 21A, the left operating device mounting portion 21*b* (one of the operating device mounting portions) and the left leg portion 21L (one of the leg portions), and a second member P2 having the right operating device mounting portion 21*c* (the other operating device mounting portion) and the right leg portion 21R (the other leg portion), with an end portion of the driver's seat mounting portion 21*a* of the first member P1 being vertically overlapped and interconnected via bolts or the like, with an end of the right operating device mounting portion 21*c* of the second member P2.

Figure 16:
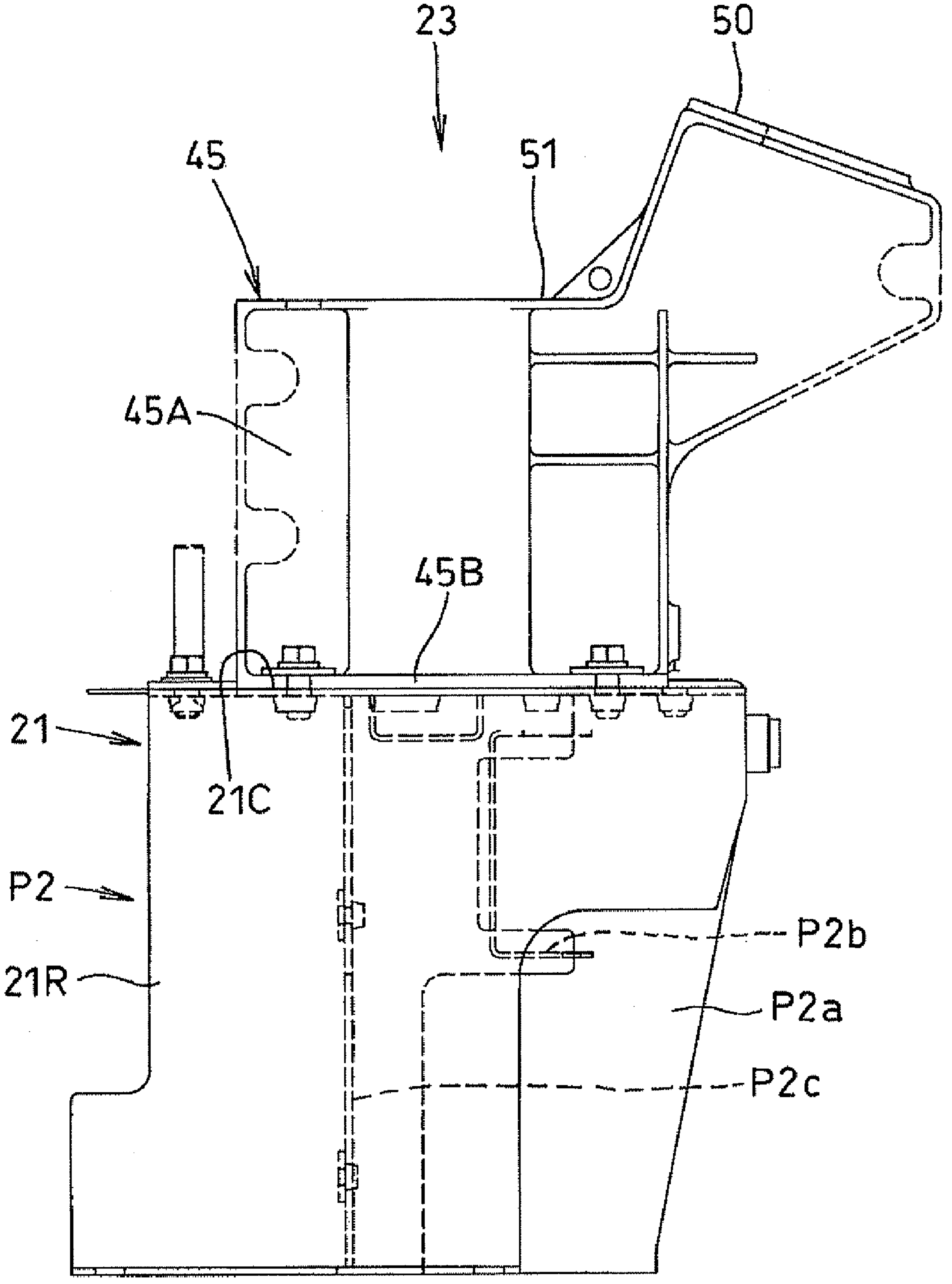
Figure 17:
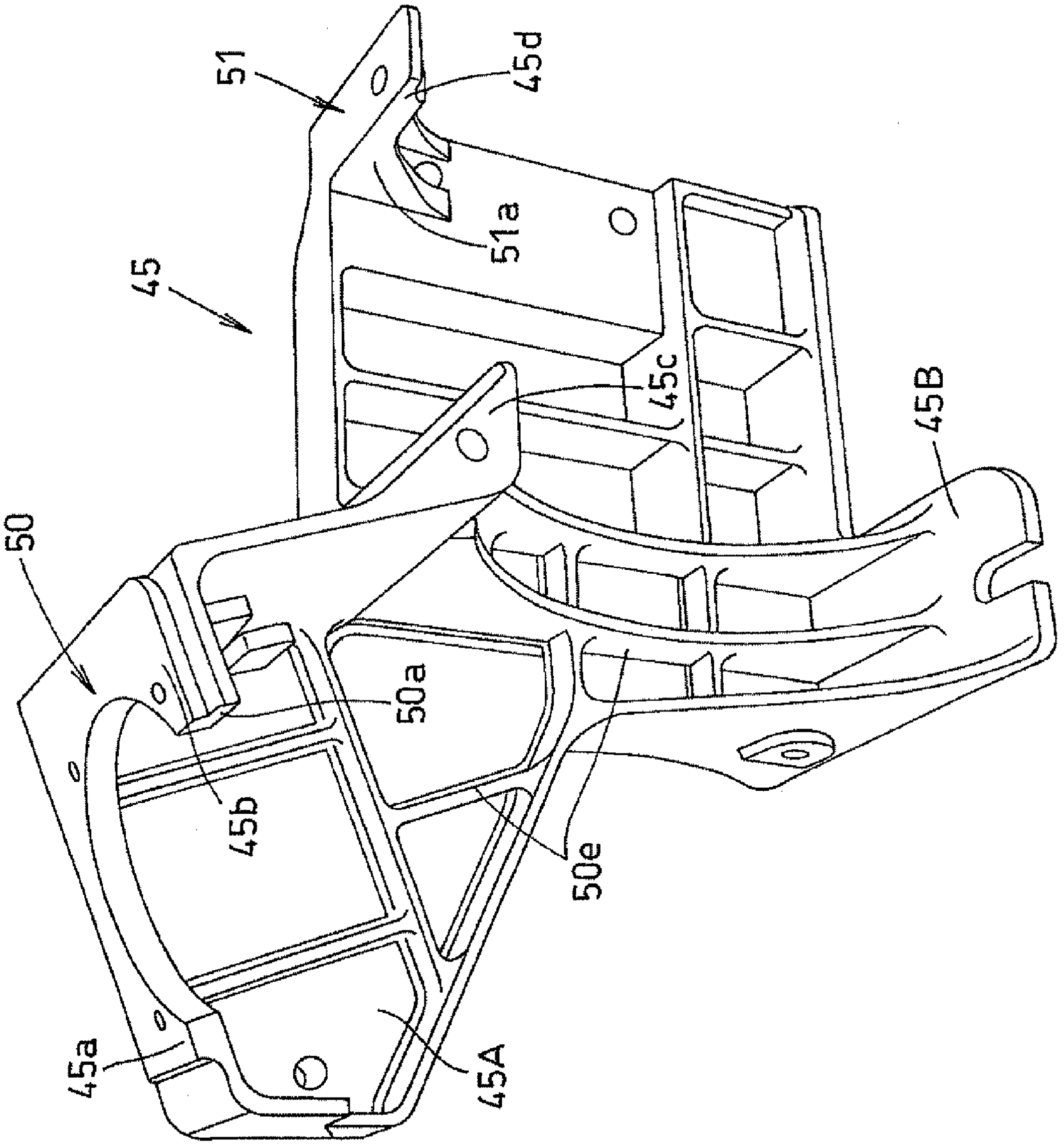
Figure 18:
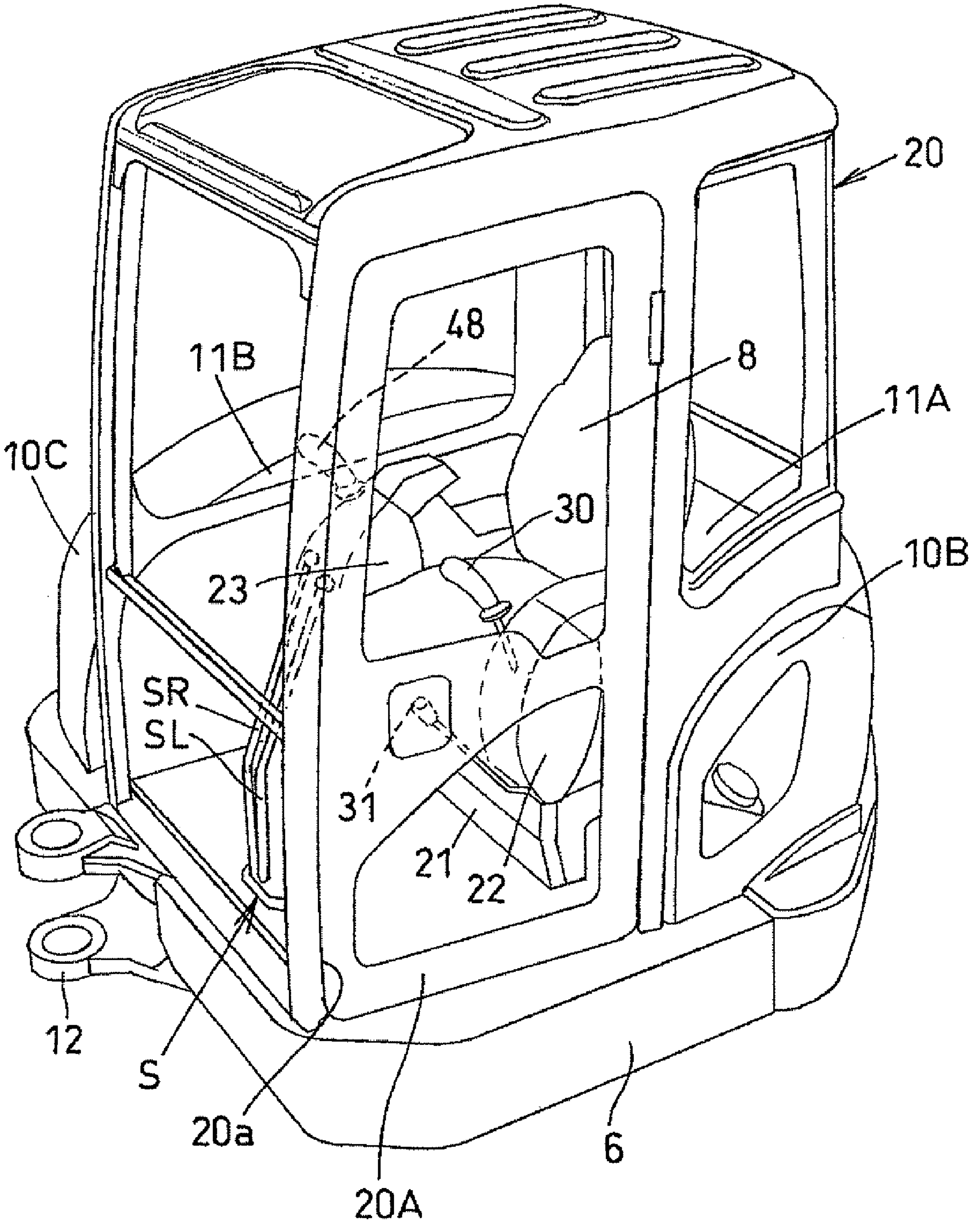

The second member P2 includes a partitioning plate P2*a* at the end on the side of the first member P1, an intermediate plate P2*b* connected to the partitioning plate P2*a* and the right leg portion 21R and partitioning these vertically from each other, and a rear face plate P2*c* disposed on the back faces thereof (shown in FIG. 6 and FIG. 16), thereby dividing the accommodating space 21B into the space inside the first member P1 and the space inside the second member P2. The space inside the first member P1 accommodates an air conditioner K1 as a vehicle instrument K whereas the space inside the second member P2 accommodates an electric box K2 holding therein relays, fuses, etc. And, the space inside the second member P2 can further accommodate therein other vehicle instrument K.

The accommodating space 21B inside the first member P1 is formed as a large space extending from under the driver's seat 8 to the underside of the left operating device 22, so this space is capable of accommodating a large component such as the air conditioner K1. Whereas, the accommodating space 21B inside the second member P2 is partitioned from the air conditioner K1 accommodating space by the partitioning wall P2*a*, the intermediate plate P2*b* and the rear face plate P2*c*, so this space provides an optimal space for storing the electric box K2 or any other instrument or device which should not be exposed to water or moisture.

The left operating device 22 is pivotable upward via a pivot mechanism 29, for the following reason. Namely, the left side (the obliquely left front side of the driver's sat, namely, the front side of the left operating device 22) of the driver's seat 8 is constructed as an entrance/exit 20*a*. So, in order not to interfere with a driver's entrance or exit, the left operating device 22 is pivoted upward for its retraction to ensure the entrance/exit 20*a* wide-open.

In FIGS. 1-4 and 6-14, the left operating device 22 supports, via a horizontal shaft 27, an operational box 26 to the operating deck 21 and in this operating box 26, a left operating valve 28 and the pivot mechanism 29 are provided.

The support bracket 25 has an approximately inverted T-shape in its front view and includes a horizontal attaching portion 25A, and a supporting portion 25B provided erect from a right/left intermediate portion of this attaching portion 25A, with the attaching portion 25A being mounted on and fixed to the upper face portion 21A of the operating deck 21. The attaching portion 25A of the support bracket 25 and the pivot mechanism 29 are located within the right/left width of the operating box 26 and the pivot mechanism 29 is disposed upwardly of the attaching portion 25A.

The operating box 26 is provided in the form of a box by welding a right plate member **26*b* forming the right wall and the rear wall to a left plate member 26*a* forming the left wall, fixedly attaching an attaching plate 26*c* to the front portions of these plate members, and fixedly attaching a bearing plate 26*d* to the inner face of the right wall of the right plate member 26*a*, and the left side face of the left plate member 26*a* being substantially flush or adjacent, in the right/left direction, to the left leg portion 21L of the operating deck 21. The spacing between the left and right plate members 26*a*, 26*b* is shorter than the width of the attaching plate 26*c***.

Referring to the operating box 26, the front upper attaching plate **26*c* forms an attaching portion 26A for the left operating valve 28 and this attaching portion 26A being attached at three points of the left front portion (front end portion opposite away from the driver's seat 8), the left rear portion and the right rear portion and a right front opened attaching hole 26B is provided from the left front portion to the right rear portion, so that through this attaching opening 26B, the left operating valve 28 can be inserted or withdrawn from the front right side which is the side of the driver's seat 8. The left operating valve 28 is a swivel/arm operating pilot valve, which is operated by the left operating lever 30**.

At the support portion 25B of the support bracket 25, there is provided a horizontal shaft 27 having a right/left axis; and at a rear lower portion of the operating box 26 of the left operating lever 22, the left plate member **26*a* and the bearing plate 26*d* together form a boss portion 26, and this boss portion 26 is fitted on the horizontal shaft 27 to be pivotable about a right/left axis. So, the horizontal shaft 27 functions as a pivot support shaft for the left operating device 22**.

Further, at a rear portion of the operating box 26, a base portion of a cam member 33 is pivoted via a pivot shaft 32. And, to the leading end of this cam member 33, a base portion of an unload lever 31 is fixed. The unload lever 31 extends from the vicinity of the support portion 25B forwardly and upwardly of the operating box 26, so as not to interfere with passenger's entrance/exit.

The cam member 33 defines a cam groove 34 extending from the base end portion to the leading end of the member 33, and from the support portion 2B of the support bracket 25, a guide pin 5 having a right/left axis projects and the cam groove 34 is engaged with this guide pin 35 via a cam follower.

In the cam groove 34, a first cam groove 34A formed on the base side and a second cam groove 34B extending from the first cam groove 34A to the leading end are formed continuously. The first cam groove 34A is formed like an arc centering about the axis of the pivot shaft 32 and the second cam groove 34B is formed like an arc centering about the axis of the horizontal shaft 27 when the unload lever 31 is pivoted from the position shown in FIG. 10 to the position shown in FIG. 11.

The pivot shaft 32 is positioned rearwardly and upwardly of the horizontal shaft 27 and the guide pin 35 is positioned forwardly and upwardly of the horizontal shaft 27 and at a position intermediate between the pivot shaft 32 and the horizontal shaft 27. So, the cam member 33 extends forwardly and downwardly from the pivot shaft 32 and the cam groove 34 is formed with a length which allows a necessary angular, e.g. 50 degree fore/aft pivotal movement of the operating box 26.

At the base portion of the cam member 33, a stay 37 is provided erect, and between this stay 37 and the attaching plate **26*c* of the operating box 26, a return spring 38 is incorporated to be contactable with a stopper 54 provided in the right plate member 26*a*. And, by the return spring 38, the unload lever 31 is urged in the depressing direction (the counterclockwise direction in FIGS. 9-11**).

At an upper portion of the bearing plate **26*d* fixed to the right plate member 26*a*, there is provided a pivot detecting means 55 comprised of a limit switch. And, a switch piece of this pivot detecting means 55 is engaged to the stay 37**.

The pivot detecting means 55 is connected to electronic controlling sections of the left and right operating devices 22, 23. In response to from ON to OFF change thereof, unload valves incorporated within hydraulic circuits of the left and right operating devices 22, 23 are operated.

More particularly, when the unload lever 31 is pulled up, so that the guide pin 35 is relatively moved within the first cam groove 34A from its base end to its leading end (the side of the second cam groove 34B), in association with the movement of the stay 37, the switch piece of the pivot detecting means 55 projects, thereby to detect pushing-up of the unload lever 31 (unloading condition), thus disabling operations of the swivel, arm, boom, bucket by the left and right operating devices 22, 23.

Further, between the support portion 25B of the support bracket 25 and the operating box 26, there is provided, via pins **39*a*, 38*b*, a gas damper 39 for assisting the upward pivotal movement of the left operating device 22, and there are provided also use position contacting means 41 and avoiding position contacting means 42** comprised of a cushion and a contacting portion.

Also, on the face of the support bracket 25 on the side of the driver's seat 8, there are provided first and second guiding members 43A, 43B for guiding a hose to be connected to the left operating valve 28. These guiding members 43A, 43B project beyond the attaching portion 25A of the support bracket 25 toward the driver's seat 8. However, since the cushioning member 8B has a right/left width shorter than the seating face of the seat 8A, the guiding members provide no interference to disposing the left operating device 22 in the vicinity of the seat 8A.

The horizontal shaft 27, the cam member 33, the unload lever 31, the return spring 38, the pivot detecting means 55, the use position contacting means 41 and the avoiding position contacting means 42, etc. together constitute the pivot mechanism 29.

Figure 1:
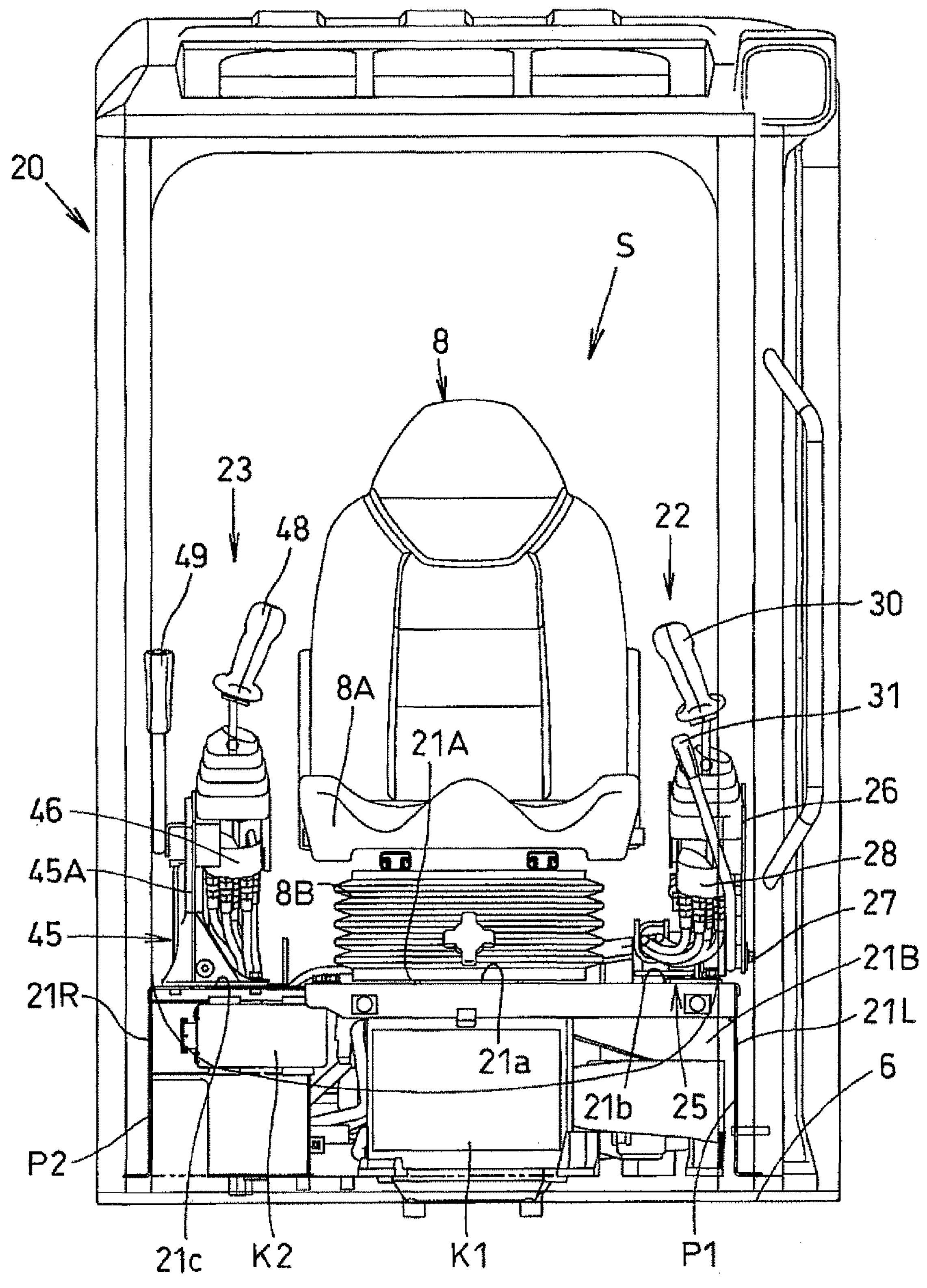
FIG. 1 a front view showing an embodiment of the invention.
Figure 2:
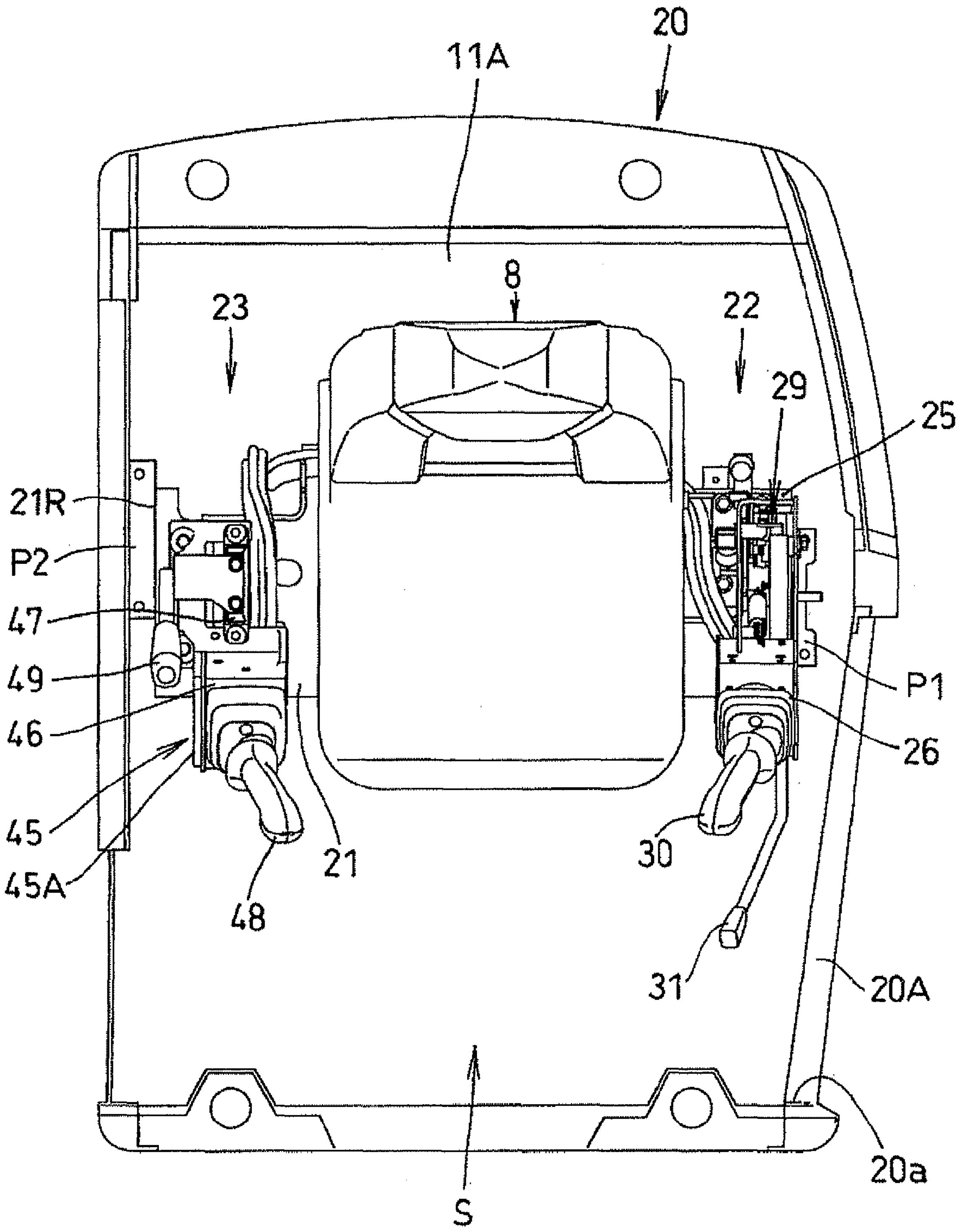
FIG. 2 a plan view of the same.
Figure 3:
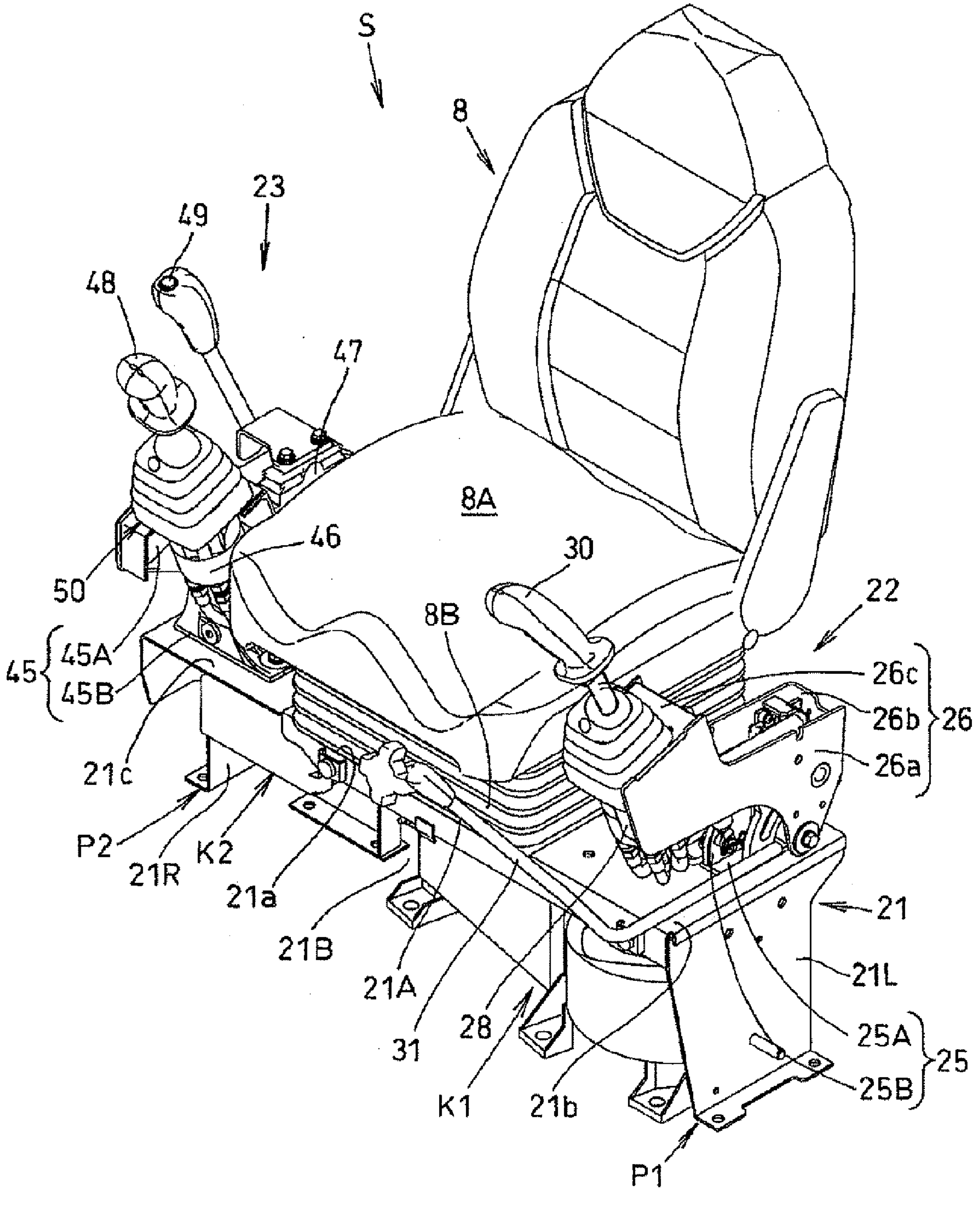
FIG. 3 a perspective view of the principal portions of the same.
Figure 4:
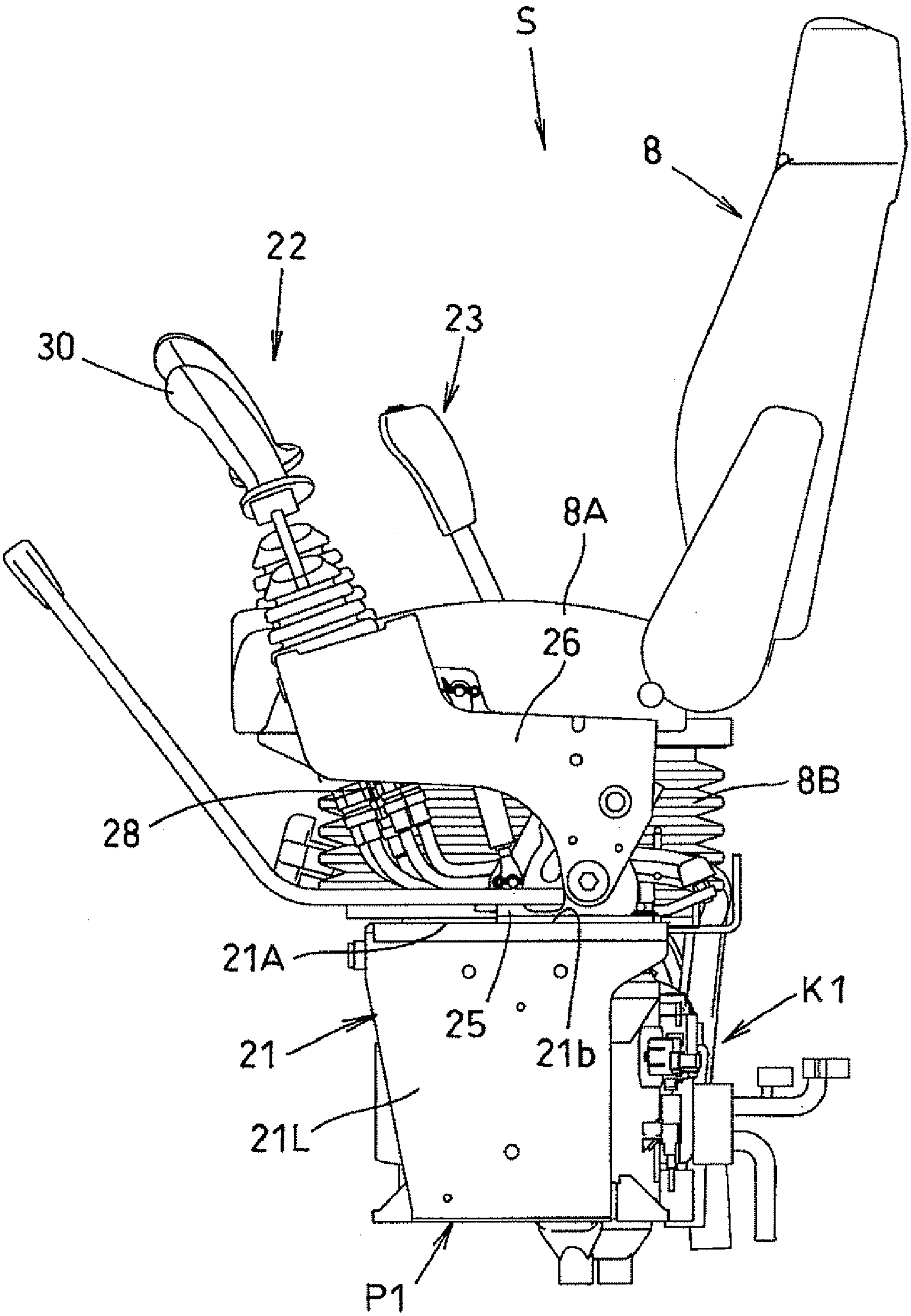
FIG. 4 a left side view of the same.
Figure 5:
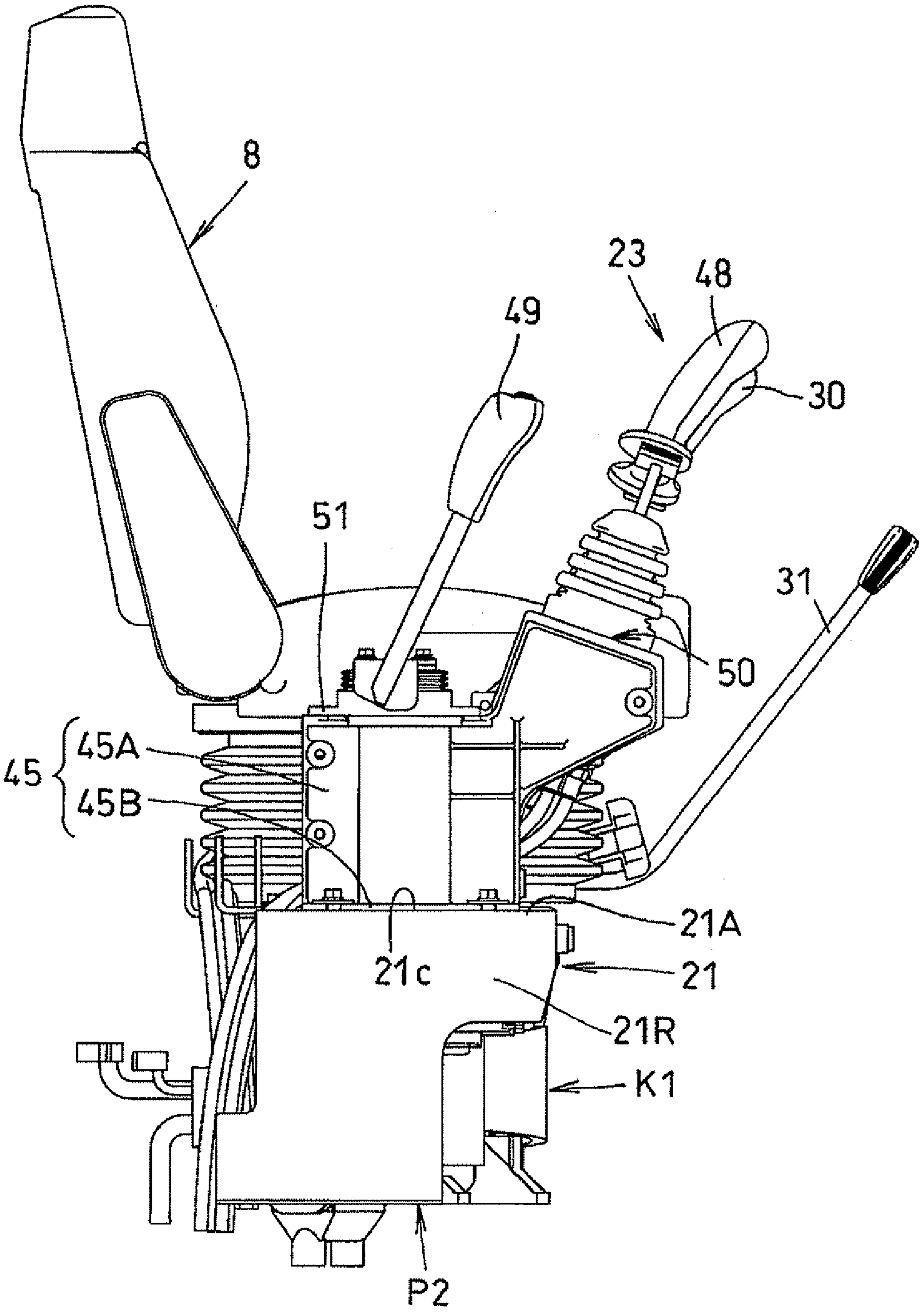
FIG. 5 a right side view of the same.
Figure 6:
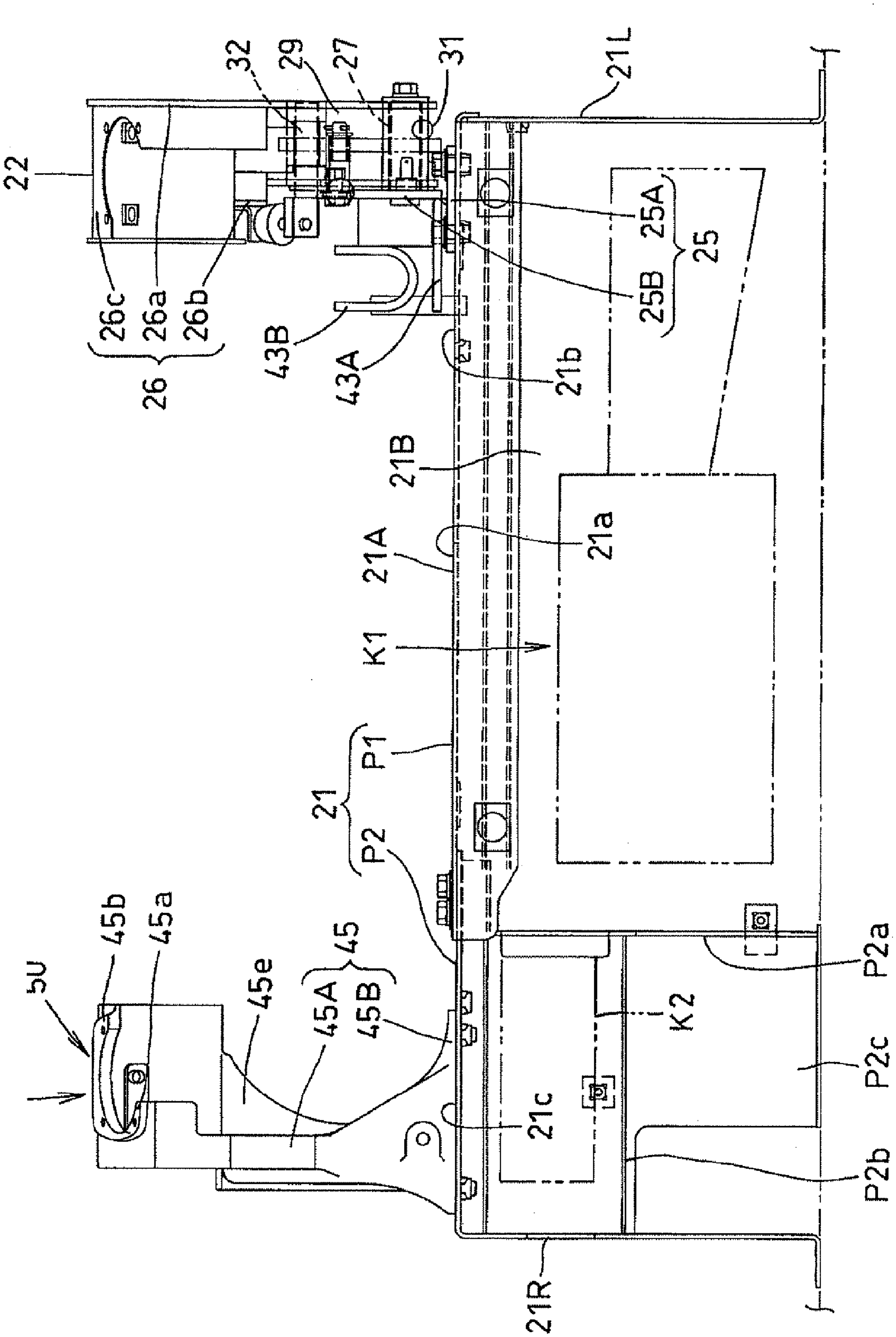
FIG. 6 a front view of an operating deck.
Figure 7:
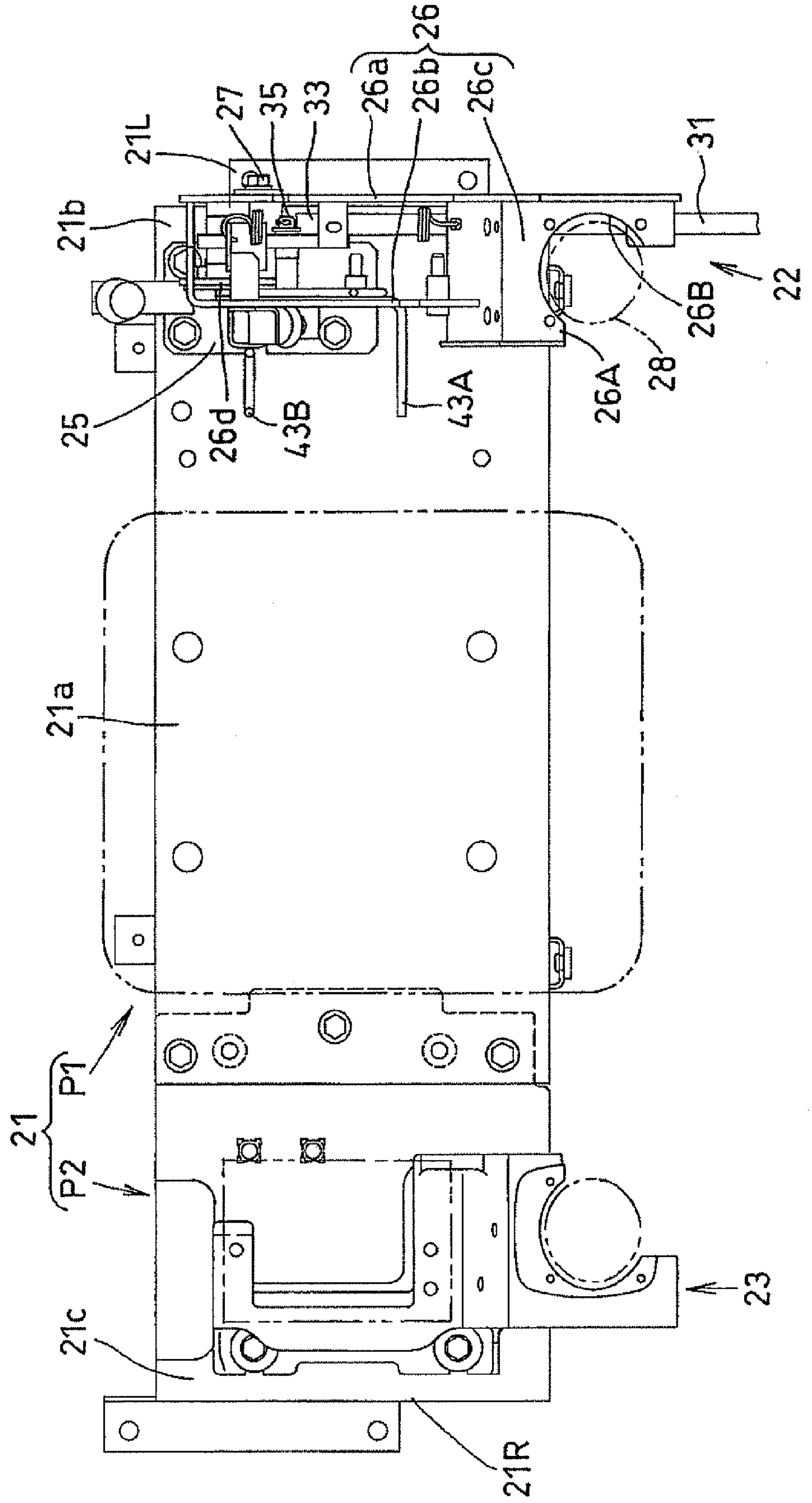
FIG. 7 a plan view of the operating deck.
Figure 8:
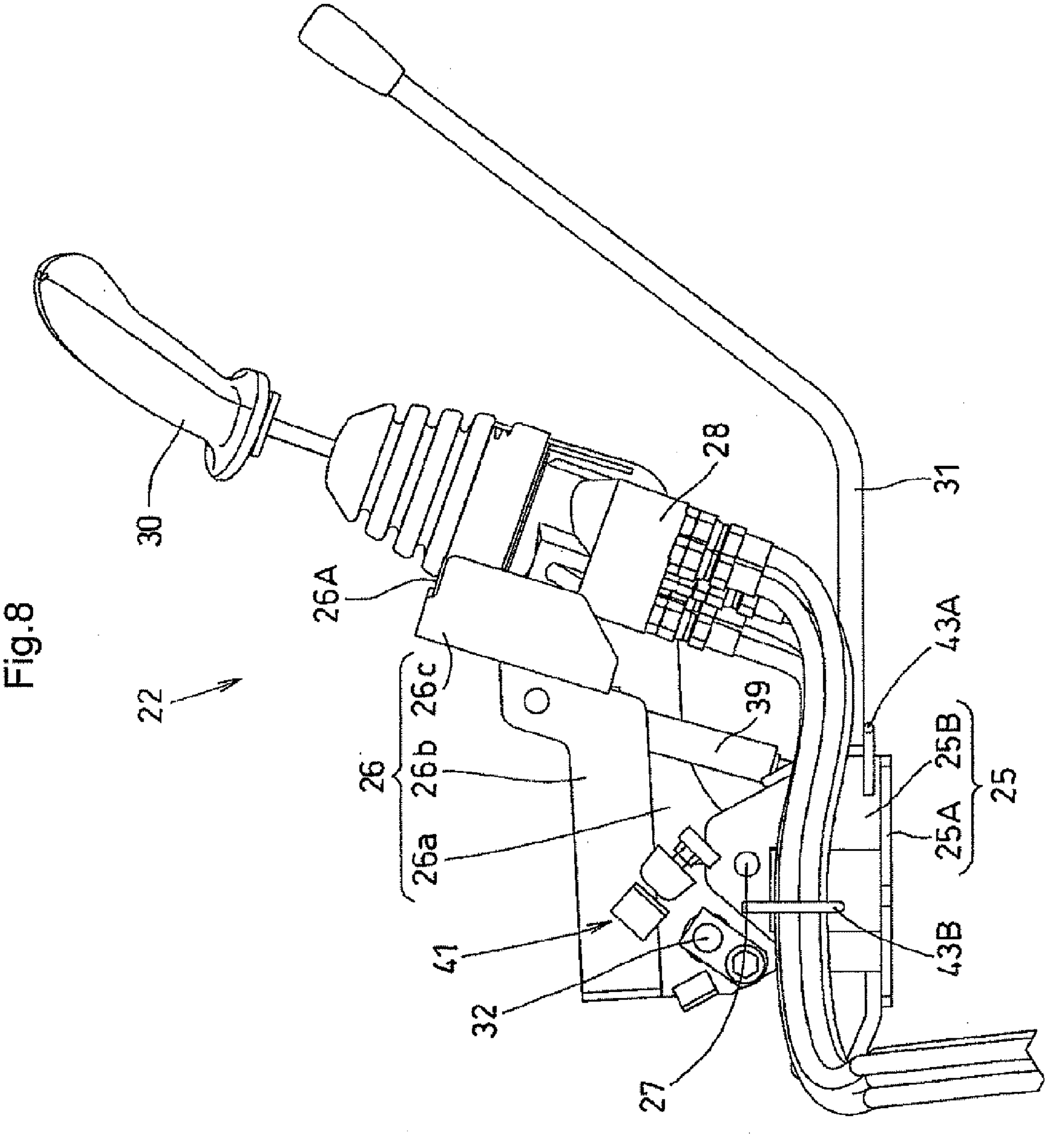
FIG. 8 a right side view of a left operating device.
Figure 9:
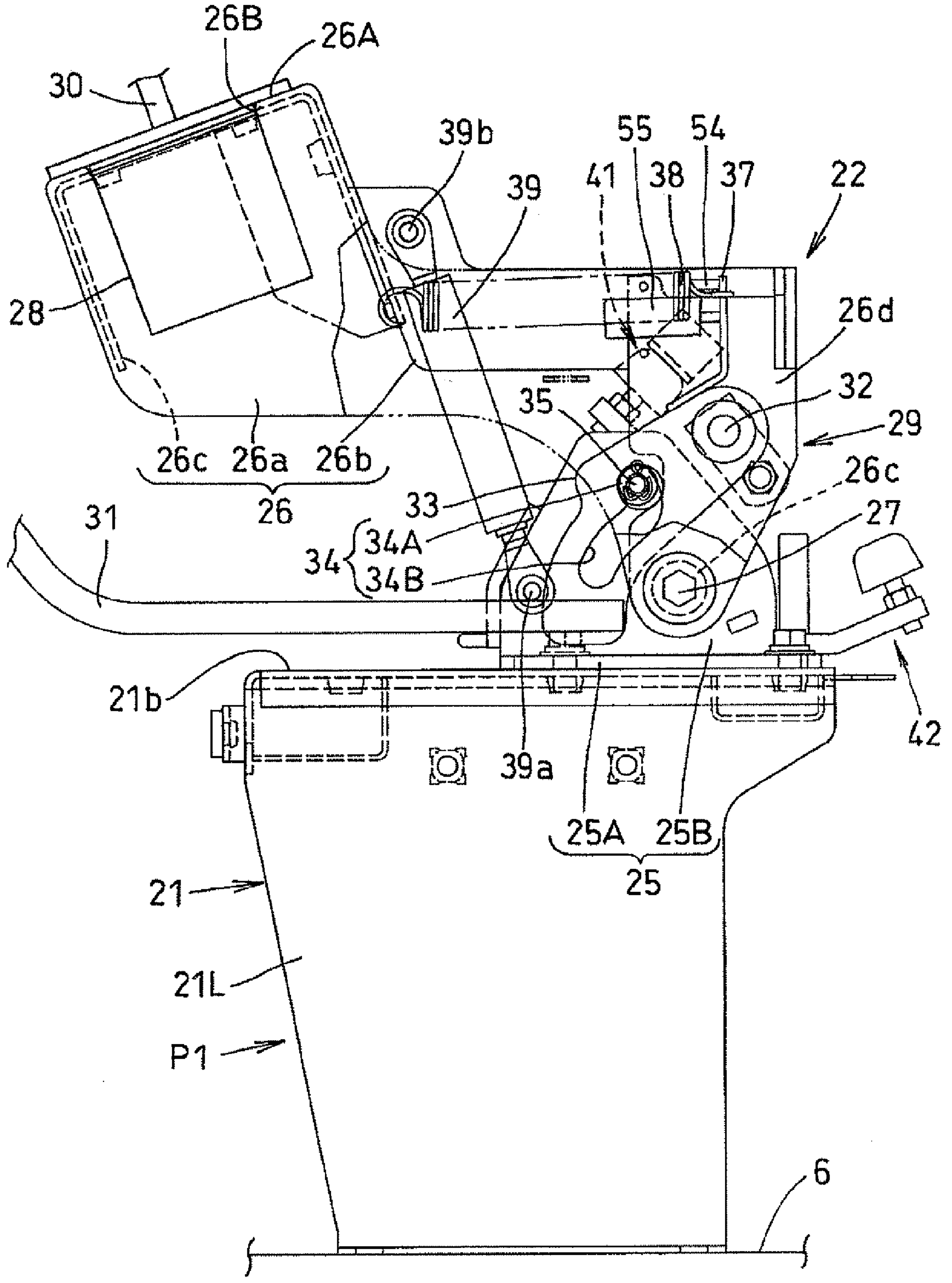
FIG. 9 a left side view showing inner construction of the left operating device, FIG. 10 an enlarged left side view showing the inner construction of the left operating device, FIG. 11 a left side view showing a condition when the left operating device is pivoted upward, FIG. 12 a plan view showing the inner construction of the left operating device, FIG. 13 a front view showing the inner construction of the left operating device, FIG. 14 a perspective view of a pivot mechanism, FIG. 15 a perspective view of a right operating device, FIG. 16 a right side view showing an operating bracket of the right operating device, FIG. 17 a perspective showing the operating bracket, FIG. 18 an overall perspective view of an operator's section, FIG. 19 an overall plan view of a swiveling work vehicle, and FIG. 20 an overall side view of the swiveling work vehicle.
Figure 10:
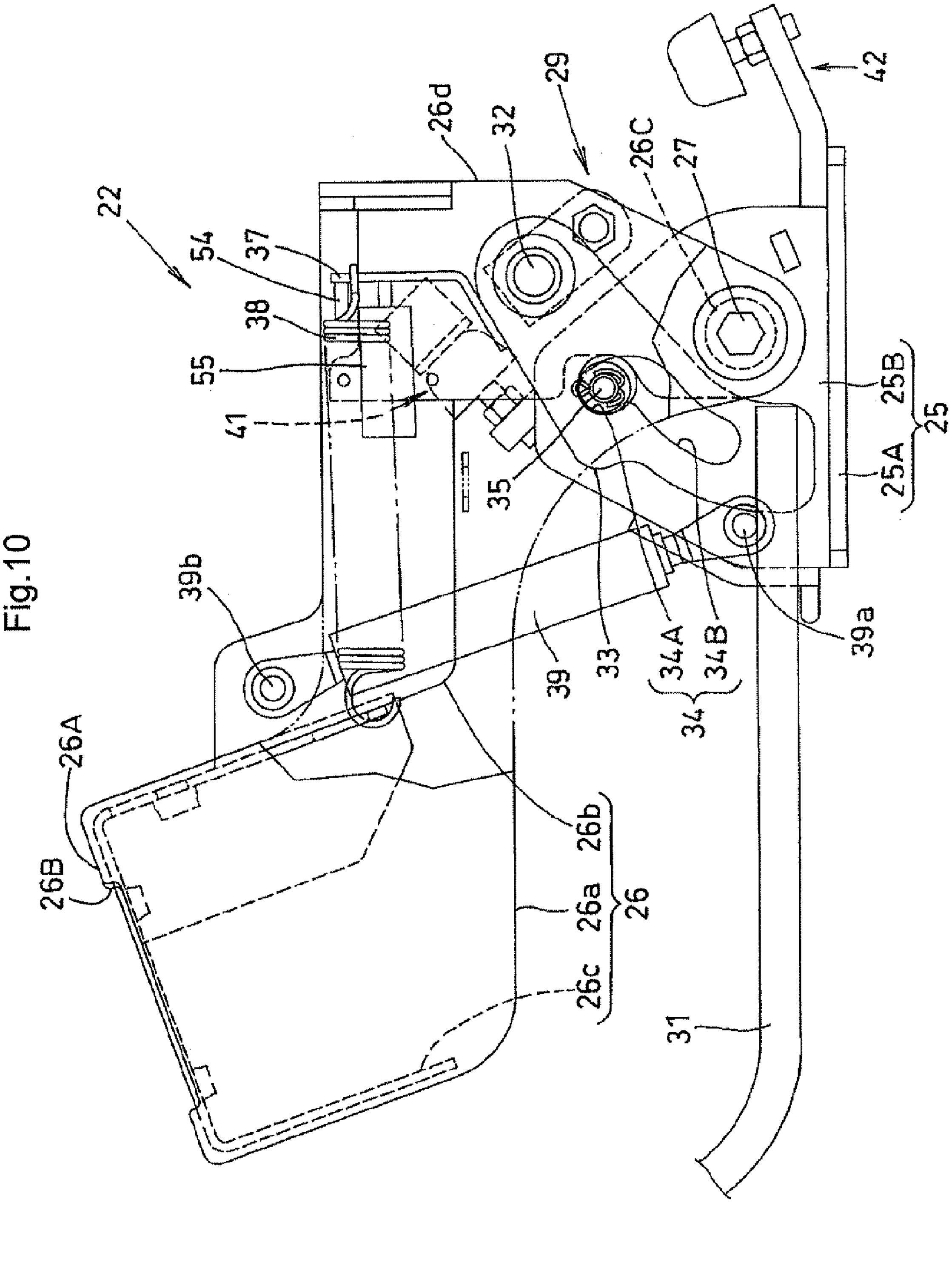

With the left operating device 22 having the above-described construction, the condition shown in FIGS. 8-10 is the use position (normal working position) for working with the backhoe 1. At this use position, the guide pin 35 is located at the base end of the first cam groove 34A and the unload lever 31 is prevented from being pivoted in the counter clock direction in FIGS. 8-10 by a stopper 54. Also, the guide pin 35 restricts pivotal movement of the operating box 26 (the left operating device 22) about the horizontal shaft 27 (in particularly, its upward pivotal movement).

Further, at the use position, if the unload lever 31 is not being operated, this unload lever 31 is located at the unload release position and the pivot detecting means 55 detects no upward pivotal movement. Under this condition, if the swivel/arm operating left operating lever 30 is operated, the swiveling of the swivel deck 6 and lift up/down of the arm 16 are allowed and operations by the boom/bucket operating right operating lever 23 are also allowed.

From the use position described above, if the unload lever 31 pivots the cam member 33 clockwise in FIGS. 8-10 and the guide pin 35 is relatively positioned at the crossing portion between the first cam groove 34A and the second cam groove 34B, the guide pin 35 comes into engagement with the second cam groove 34B in the form of arc centering about the axis of the horizontal shaft 27, so that upward pivotal movement of the operating box 26 about the horizontal axis 27 is allowed and the pivot detecting means 55 is turned OFF, so the unload condition by the unload lever 31 is detected.

Figure 11:
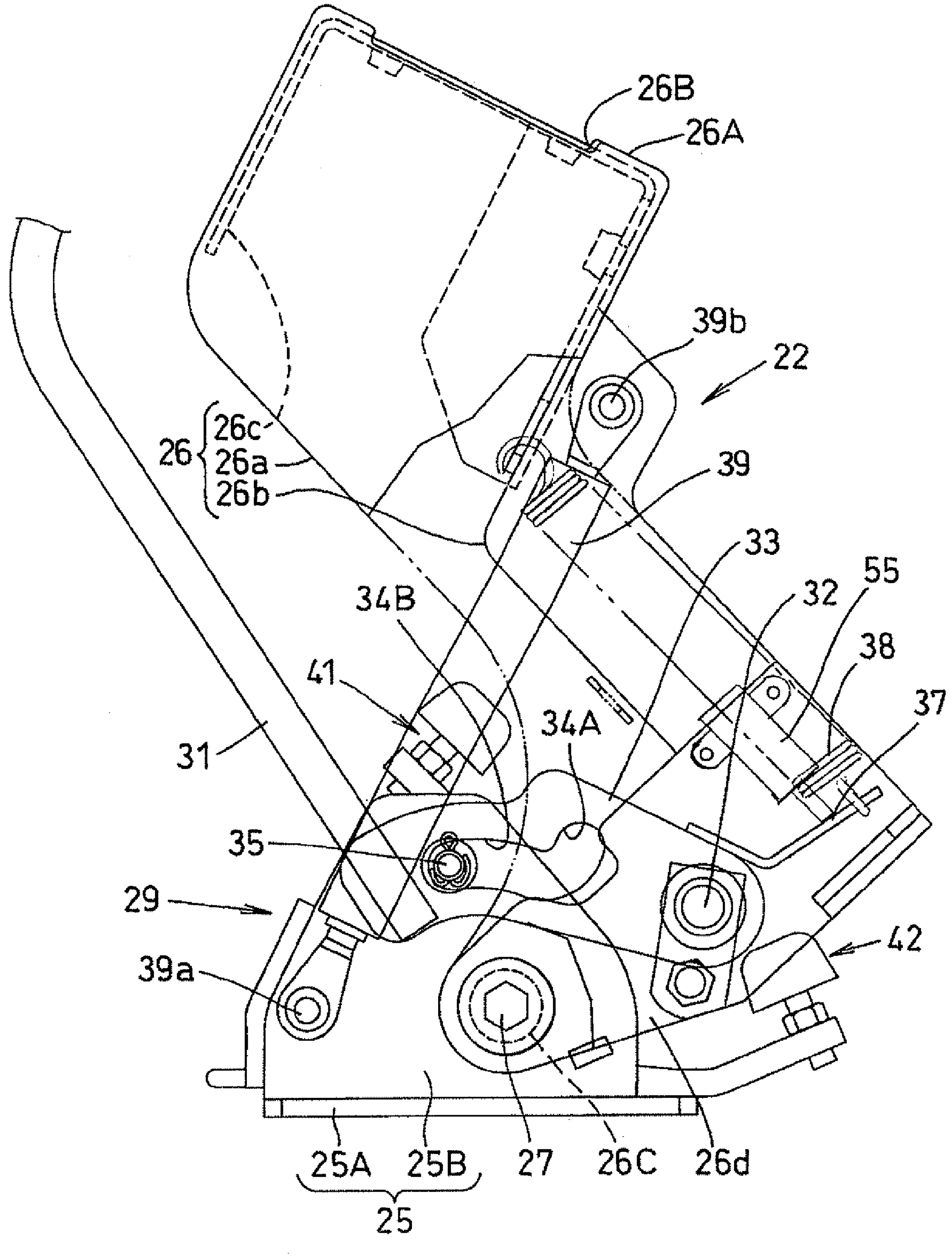
Figure 12:
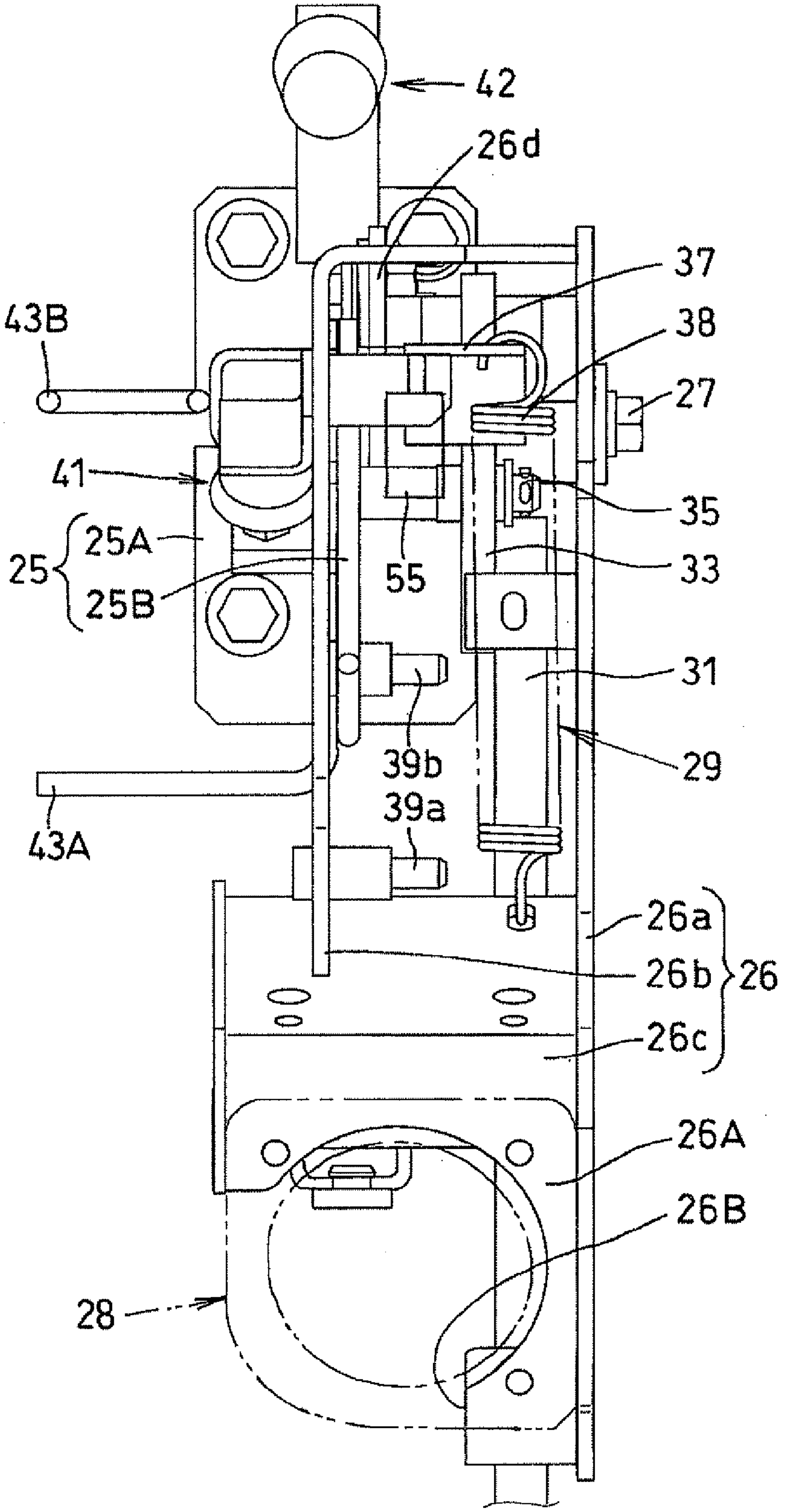
Figure 13:
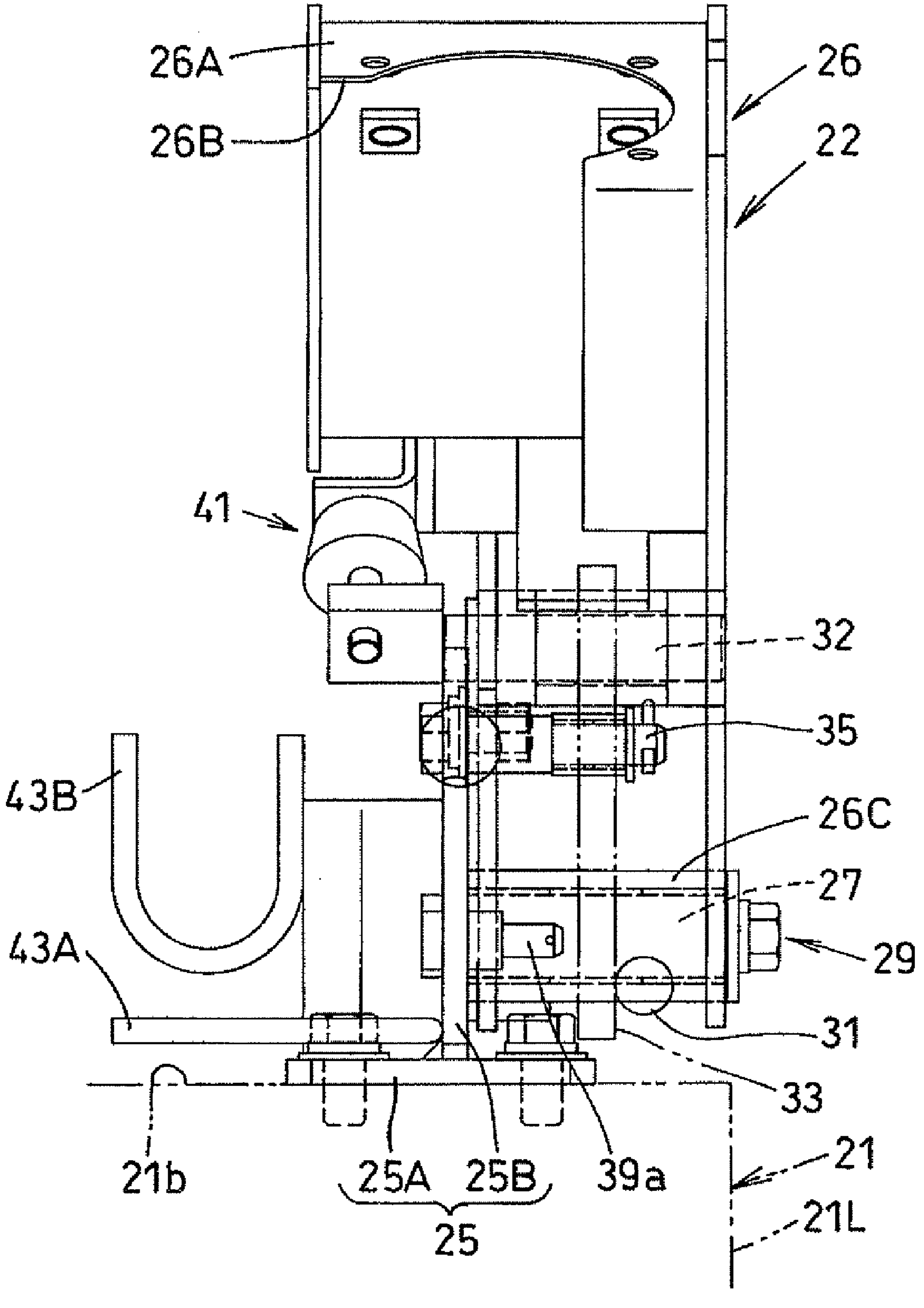
Figure 14:
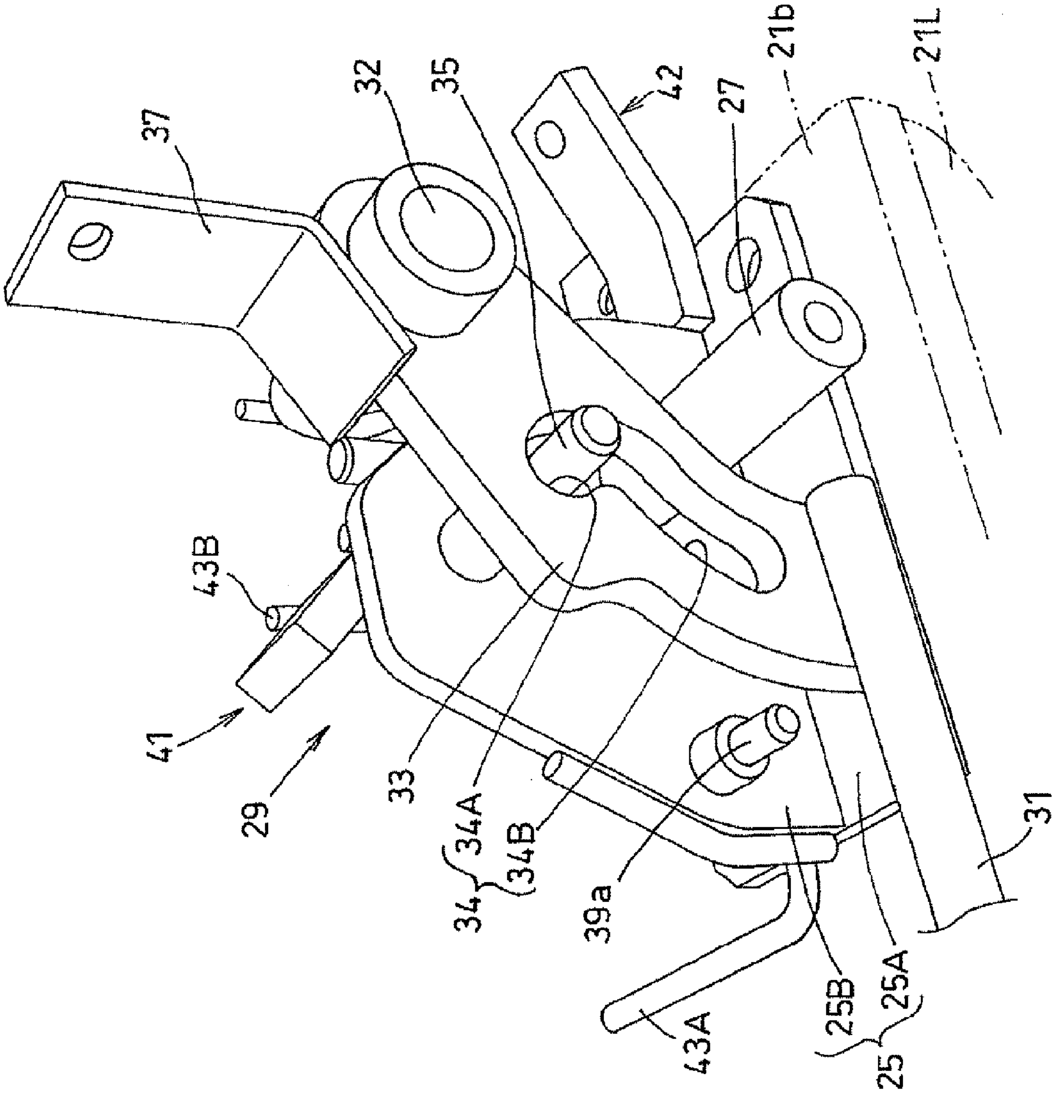
Figure 15:
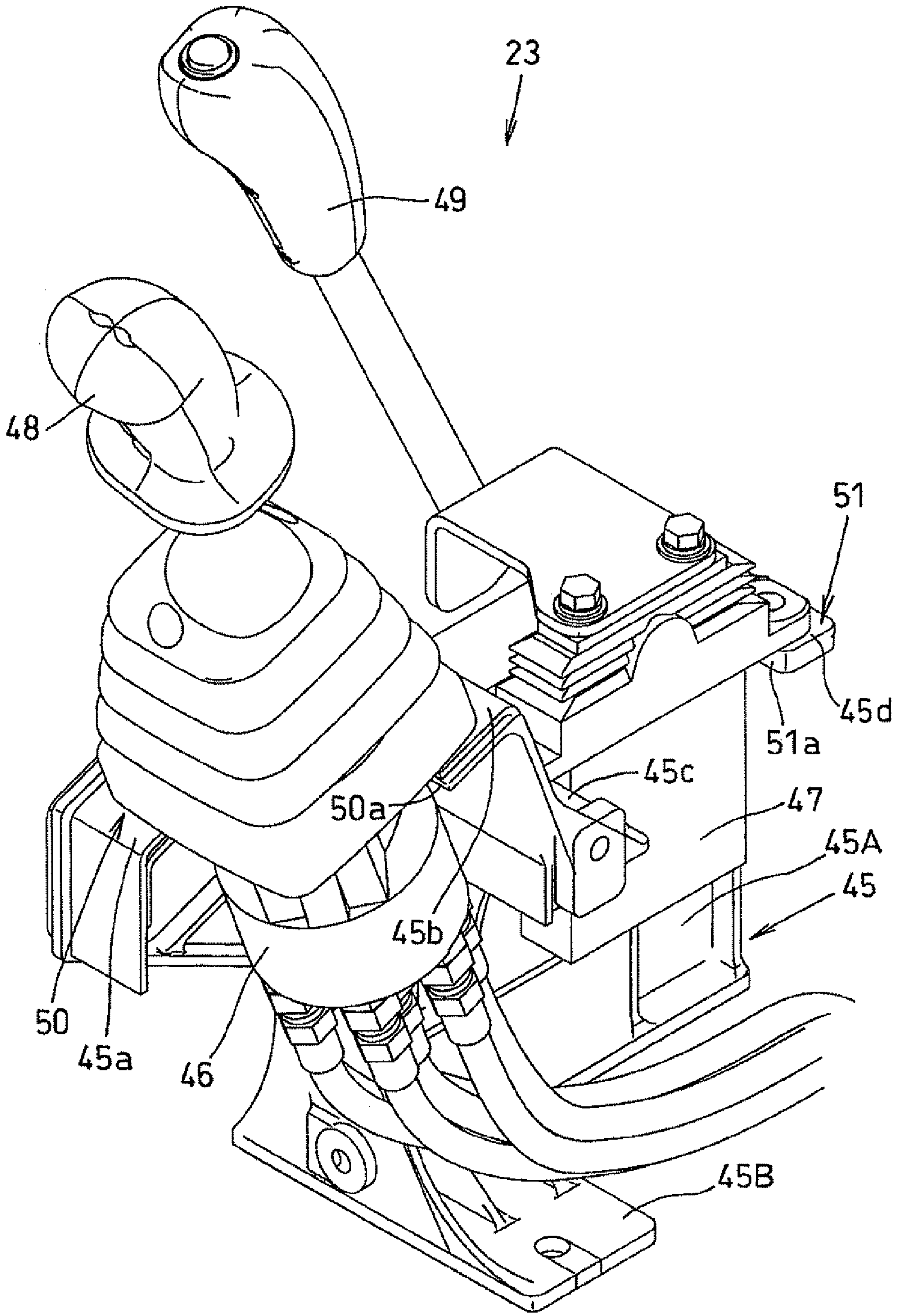

After the unload lever 31 has assumed the unload condition, if this lever is further upwardly pivoted together with the operating box 26, the left operating device 22 assumes the upward pivoted position shown in FIG. 11, thus being upwardly retracted to keep the entrance/exit 20*a* wide open.

Under this upwardly pivoted condition, even if the swivel/arm operating left operating lever 30 is operated, operations of the swivel deck 6 and the arm 15 are inhibited and even if the boom/bucket operating right operating device 23 is operated, operations of the boom 14 and the bucket 16 are inhibited.

When the unload lever 31 is pushed up from the use position to the unload condition, until a gas damper 39 becomes its maximum extended condition, the upward pivotal movement of the operating box 26 about the horizontal shaft 27 is assisted. And, the lever is retained at the avoiding position by the avoiding position contacting means 42.

In FIGS. 1-3, 5-7 and 15-17, in the right operating device 23, the operating bracket 46 includes the operating valve (first valve) 46 and the implement operating valve (second valve) 47, and the right operating valve 46 is operable by the right operating lever 48 and the implement operating valve 47 is operable by the implement operating lever 49, respectively.

The operating bracket 45 includes a vertical wall 45A and a lower attaching portion 45B, with the attaching portion 45B being placed, from above, on the right operating device mounting portion 21*c* provided in the upper face of the operating deck 21 and bolt-fixed thereto.

The vertical wall 45A mounted erect on the operating deck 21 includes a plurality of projections 45*a*-45*d* projecting from the upper portion thereof to one lateral side, i.e. toward the driver's seat 8. The upper face of the vertical wall 45A and the projections 45*a*, 45*b* together form a first attaching portion 50 for attaching the right operating valve 46, whereas, the upper face and the projections 45*c*, 45*d* together form a second attaching portion 51 for attaching the implement operating valve 47.

Referring to the operating bracket 45, the attaching portion 46B, the vertical wall 45A and the plurality of projections 45*a*-45*d* are integrally formed by die-casting. The projection 45*b* and the projection 45*c* project integrally, though a step being formed therebetween. On the face of the vertical wall 46A on the side of the driver's seat 8, a number of reinforcing rib projections 50*e* are formed vertically and laterally, downwardly of the projections 45*a*-45*d*.

The right operating valve 46 is a boom/bucket operating pilot valve, so by the right operating lever 48, control valves for the boom cylinder 17 and the bucket cylinder 19 can be controlled. The implement operating valve 47 is a dozer device operating pilot valve, so that by the implement operating lever 49, the control valve for the dozer cylinder can be controlled.

Referring to the operating bracket 46, as the rib projections 50*e* are provided for reinforcement, although this bracket is provided as a cantilever construction having only the vertical wall 45A, sufficient strength can be ensured, even if the bracket is not provided in the form of a box. Further, as the bracket is formed by die-casting, there occurs no generation of burr or cutting burr which would be generated in the case of forming by plate metal. Hence, it is possible to reduce damage to the hose to be connected to the valves and the rib projections 60*e* function like hose guides.

The first attaching portion 50 of the right operating valve 46 includes an attaching opening 50*a* at the front portion thereof on the side of the driver's seat 8, so that the right operating valve 46 can be inserted or withdrawn from the side of the driver's seat 8; and the second attaching portion 51 of the implement operating valve 47 includes an attaching opening 51*a* on the lateral side of the driver's seat 8, so that the implement operating valve 47 can be inserted or withdrawn from the lateral side of the driver's seat 8.

That is to say, the right operating valve 46 and the implement operating valve 47 can be attached/detached, not in the vertical direction, but from the right/left side, relative to the operating bracket 46, with the hoses being kept connected thereto.

The assembly, replacement and maintenance of the right operating valve 46 and the implement operating valve 47, etc. can be carried out, with the operating bracket 46 and the driver's seat being kept attached on the operating deck 21.

With the right operating device 22 being disposed as described above, the vertical wall 45A is located adjacent the right leg portion 21R and on the right outer side thereof, the implement operating lever 49 is disposed and immediately above the right left portion 21R, and these compositions are disposed adjacent the right side wall of the cabin 20.

In case, a ROPS device or a canopy device is attached to the backhoe 1 instead of the cabin 20, like the left operating device 22, a pivot mechanism can be provided in the right operating device 23 to be upwardly pivotable by the unload lever.

Incidentally, the shapes, the fore/aft, right/left and upper/lower positional relationships of the respective components are best as shown in FIGS. 1-20. However, the present invention is not limited thereto, and it is possible to change or modify the shapes and constructions or change the combinations thereof.

For instance, with the backhoe 1 described above, the tank room of the operational oil tank T or the like is disposed on the right side of the vehicle body 6. Instead, the tank room can be disposed on the left side of the vehicle body 6 and the layouts of the operational tank T and the driver's seat 8 and the arrangements of the left and right operating devices 22, 23 can be in reverse in the right and left direction.

Further, in the above construction, the implement operating lever 49 is disposed on the right side of the vertical wall 45A of the operating bracket 45. Instead, this can be disposed on the left side, like the implement operating valve 47. In this case, the vertical wall 45A can be disposed at the outermost end of the mounting portion 21*c* of the operating deck 21, that is, immediately above the right leg portion 21R.

In the operating deck 21, the portion thereof from the left leg portion 21L to the right leg portion 21R can be formed by bending a single plate in the form of a one-side open rectangular shape. Also, in the foregoing construction, one partitioning plate P2*a* is provided at an intermediate portion of the left and left leg portions 21L, 21R. Instead, this plate can be omitted or two or more of the same can be provided.

The invention claimed is:

1. An operator's section construction for a work vehicle, comprising:

an operating deck mounted on a vehicle body;

a driver's seat mounted on the operating deck;

a first operating device provided on one of right and left sides of the operating deck; and a second operating device provided on the other of the right and left sides of the operating deck;

wherein a mounting portion for the driver's seat, a mounting portion for the first operating device, and a mounting portion for the second operating device are formed on an upper face of the operating deck;

wherein the driver's seat, the first operating device and the second operating devices are mounted on the respective mounting portions independently of each ether other;

wherein said operating deck includes a substantially flat upper face portion, a left leg portion and a right leg portion, said left leg portion is provided in substantial correspondence with a left side face of one of said first and second operating devices, and said right leg portion is provided in substantial correspondence with a right side face of the other of said first and second operating devices; and wherein an accommodating space opened on the front side thereof is formed downwardly of said upper face portion and between said right and left leg portions, and said accommodating space accommodates a vehicle instrument therein.

2. An operator's section construction for a work vehicle, comprising:

an operating deck mounted on a vehicle body;

a driver's seat mounted on the operating deck;

a first operating device provided on one of right and left sides of the operating deck; and a second operating device provided on the other of the right and left sides of the operating deck;

wherein a mounting portion for the driver's seat, a mounting portion for the first operating device, and a mounting portion for the second operating device are formed on an upper face of the operating deck;

wherein the driver's seat, the first operating device and the second operating devices are mounted on the respective mounting portions independently of each other;

wherein said first operating device includes an operating box which includes an operating valve;

wherein a support bracket attached erect on the upper face of said operating deck supports said operating box via a pivot mechanism such that said first operating device is supported to be pivotable about a horizontal axis from a use posture;

wherein said first operating device is disposed on the upper face of said operating deck; and wherein said pivot mechanism is disposed upwardly of the upper face of said operating deck.

3. The operator's section construction of claim 2, wherein said support bracket includes an attaching portion to be fixed to the upper face of said operating deck, and a supporting portion provided erect from said attaching portion for supporting said operating box; said attaching portion is positioned substantially within a right/left width of said operating box; and a face of said operating box opposite from said driver's seat is adjacent, in the right/left direction, to an end of said operating deck.

4. The operator's section construction of claim 3, wherein said operating box includes, at a front upper portion thereof, an attaching portion for an operating valve, said attaching portion being attached at three points of the front portion and the rear portion of the operating valve opposite away from the driver's seat, and the rear portion on the side of the driver's seat and further includes an attaching hole provided on the side of the driver's seat and on the front side.

5. An operator's section construction for a work vehicle, comprising:

an operating deck mounted on a vehicle body;

a driver's seat mounted on the operating deck;

a first operating device provided on one of right and left sides of the operating deck; and a second operating device provided on the other of the right and left sides of the operating deck;

wherein a mounting portion for the driver's seat, a mounting portion for the first operating device, and a mounting portion for the second operating device are formed on an upper face of the operating deck;

wherein the driver's seat, the first operating device and the second operating devices are mounted on the respective mounting portions independently of each other;

wherein said second operating device includes a first valve and a second valve in an operating bracket;

wherein said operating bracket includes a plurality of projecting portions projecting to the lateral said from a vertical wall provided erect on said operating deck; and wherein said plurality of projecting portions function as an attaching portion for attaching said first valve and said second valve from the right and left sides.

6. The operator's section construction of claim 5, wherein said projecting portions are formed as projections integral with said vertical wall to the side of said driver's seat; the attaching portion of said first valve includes an attaching opening at a front portion thereof on the side of the driver's seat; and the attaching portion of said second valve includes an attaching opening at a side portion on the side of the driver's seat.

* * * * *